(12) United States Patent
Yoshida

(10) Patent No.: US 11,112,504 B2
(45) Date of Patent: Sep. 7, 2021

(54) MEASUREMENT MONITORING DEVICE AND COMPUTER READABLE MEDIUM

(71) Applicant: Mitsubishi Electric Corporation, Chiyoda-ku (JP)

(72) Inventor: Mitsunobu Yoshida, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/963,016

(22) PCT Filed: Feb. 20, 2018

(86) PCT No.: PCT/JP2018/006063
§ 371 (c)(1),
(2) Date: Jul. 17, 2020

(87) PCT Pub. No.: WO2019/163005
PCT Pub. Date: Aug. 29, 2019

(65) Prior Publication Data
US 2020/0341151 A1    Oct. 29, 2020

(51) Int. Cl.
| | |
|---|---|
| *G01S 17/894* | (2020.01) |
| *B60R 11/02* | (2006.01) |
| *G01S 7/481* | (2006.01) |
| *G01S 7/51* | (2006.01) |
| *G01S 17/08* | (2006.01) |
| *B60R 11/00* | (2006.01) |

(52) U.S. Cl.
CPC ............ *G01S 17/894* (2020.01); *B60R 11/02* (2013.01); *G01S 7/4814* (2013.01); *G01S 7/4817* (2013.01); *G01S 7/51* (2013.01); *G01S 17/08* (2013.01); *B60R 2011/004* (2013.01)

(58) Field of Classification Search
CPC ........ G01S 17/931; G01S 7/497; G01S 17/46; G01S 17/42; G01S 2007/4975; G01S 2013/9324; G01S 17/894; G01S 7/51; G01S 17/08; G01S 17/89; B60R 11/02; B60R 2011/004
See application file for complete search history.

(56) References Cited

U.S. PATENT DOCUMENTS

2010/0253539 A1*  10/2010  Seder ................. G01S 13/87
                                              340/903
2018/0188362 A1*  7/2018  Fujita .................. G01S 17/931

FOREIGN PATENT DOCUMENTS

| EP | 3 299 763 A1 | 3/2018 |
| WO | WO 2016/185637 A1 | 11/2016 |

OTHER PUBLICATIONS

International Search Report dated Apr. 3, 2018 in PCT/JP2018/006063 filed Feb. 20, 2018.

* cited by examiner

*Primary Examiner* — Luke D Ratcliffe
(74) *Attorney, Agent, or Firm* — Oblon, McClelland, Maier & Neustadt, L.L.P.

(57) ABSTRACT

An acquisition unit acquires laser measurement data every time a laser measurement is performed. Based on the acquired laser measurement data, a first detection unit detects an attention angle, which is an irradiation angle corresponding to a measurement distance not included in a standard distance range. A second detection unit detects a warning angle, which is an irradiation angle matching the attention angle for a time longer than an allowable time. A warning unit issues a warning when the warning angle is detected.

11 Claims, 24 Drawing Sheets

MEASUREMENT MONITORING DEVICE AND COMPUTER READABLE MEDIUM

TECHNICAL FIELD

The present invention relates to techniques for monitoring laser measurement on a real-time basis.

BACKGROUND ART

An MMS (mobile mapping system) is a system for use in generating a roadmap.

In the MMS, a laser scanner and other various sensors are mounted on a measuring vehicle. And, various measurements are performed while the measuring vehicle is traveling a road. For example, the laser scanner measures a road-surface shape.

After the measuring vehicle travels the road, a postprocess is performed.

In the postprocess, three-dimensional point-cloud data is generated based on various types of measurement data. The three-dimensional point-cloud data indicates the position and shape of a road.

In Patent Literature 1, a point-cloud image generation device and a display system are disclosed.

The point-cloud image generation device generates three-dimensional point-cloud data based on various types of measurement data acquired by a measuring vehicle, and generates a point-cloud image based on the three-dimensional point-cloud data. And, the display system displays a point-cloud image.

CITATION LIST

Patent Literature

Patent Literature 1: WO 2016/185637

SUMMARY OF INVENTION

Technical Problem

In the following cases, road surface data cannot be acquired by the laser scanner. The road surface data is measurement data acquired by measuring a road-surface shape by the laser scanner.

(1) When the measuring vehicle is traveling alongside of another vehicle, laser light is blocked by the other vehicle. Thus, road surface data of a road surface on the other vehicle side cannot be acquired.

(2) When the road surface is wet, laser light is less prone to be reflected toward the laser scanner. Thus, road surface data cannot be acquired. The same goes for a case in which the road surface is a snowy road. Also, if the road surface has just finished being paved, black reflection occurs. Thus, road surface data cannot be acquired.

(3) When a droplet of water or dust is attached on a laser surface, it is not irradiated with laser light. Thus, road surface data cannot be acquired.

When road surface data cannot be acquired successively over a specified time, a remeasurement by the measuring vehicle is required.

And, it is only after a postprocess is performed that it is possible to notice that road surface data could not be acquired successively over the specified time.

Thus, a necessity occurs for performing a remeasurement by the measuring vehicle after a postprocess is performed.

An object of the present invention is to allow a reduction in remeasurements by the measuring vehicle after a postprocess is performed.

Solution to Problem

A measurement monitoring device according to the present invention is mounted on a measuring vehicle having a laser scanner mounted thereon.

The laser scanner repeatedly performs a laser measurement for acquiring laser measurement data.

The laser measurement data indicates a measurement distance for each irradiation angle of laser light.

The measurement monitoring device includes:
an acquisition unit to acquire the laser measurement data every time the laser measurement is performed;
a first detection unit to detect an attention angle, which is an irradiation angle corresponding to a measurement distance not included in a standard distance range, based on the acquired laser measurement data;
a second detection unit to detect a warning angle, which is an irradiation angle matching the attention angle for a time longer than an allowable time; and
a warning unit to issue a warning when the warning angle is detected.

Advantageous Effects of Invention

According to the present invention, it is possible to notify an operator during a laser measurement that the laser measurement is not being accurately performed. As a result, it is possible to reduce remeasurements by the measuring vehicle after a postprocess is performed.

DESCRIPTION OF EMBODIMENTS

Figure 1:
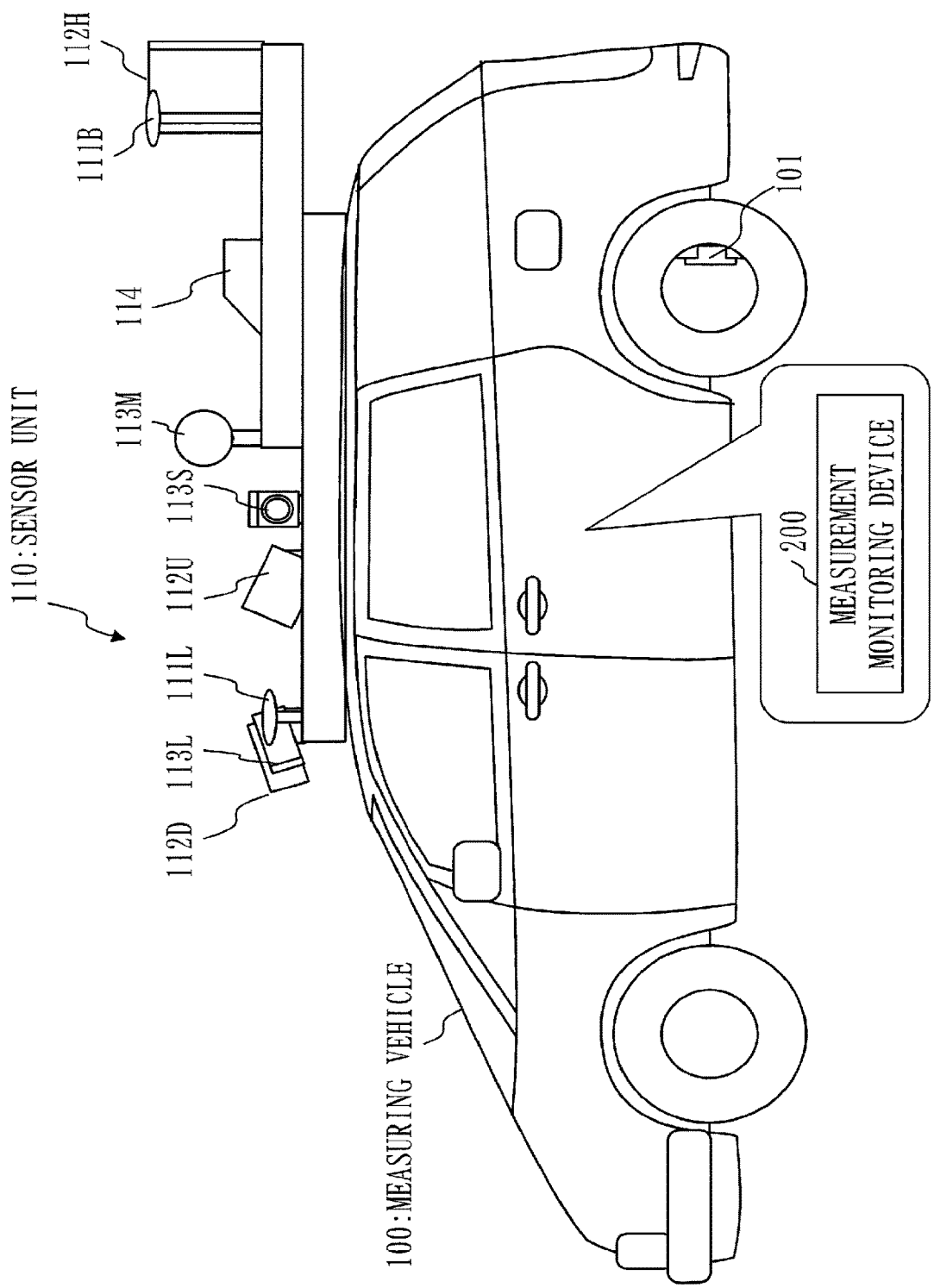
FIG. 1 is a side view of a measuring vehicle 100 in Embodiment 1.

In embodiments and drawings, identical components and corresponding components are provided with the same reference character. Description of the components provided with the same reference character is omitted or simplified as appropriate. An arrow in a drawing mainly indicates a flow of data or a flow of process.

Embodiment 1

An embodiment in which a laser measurement is monitored on a real-time basis is described based on FIG. 1 to FIG. 18.

Description of Structure

Figure 2:
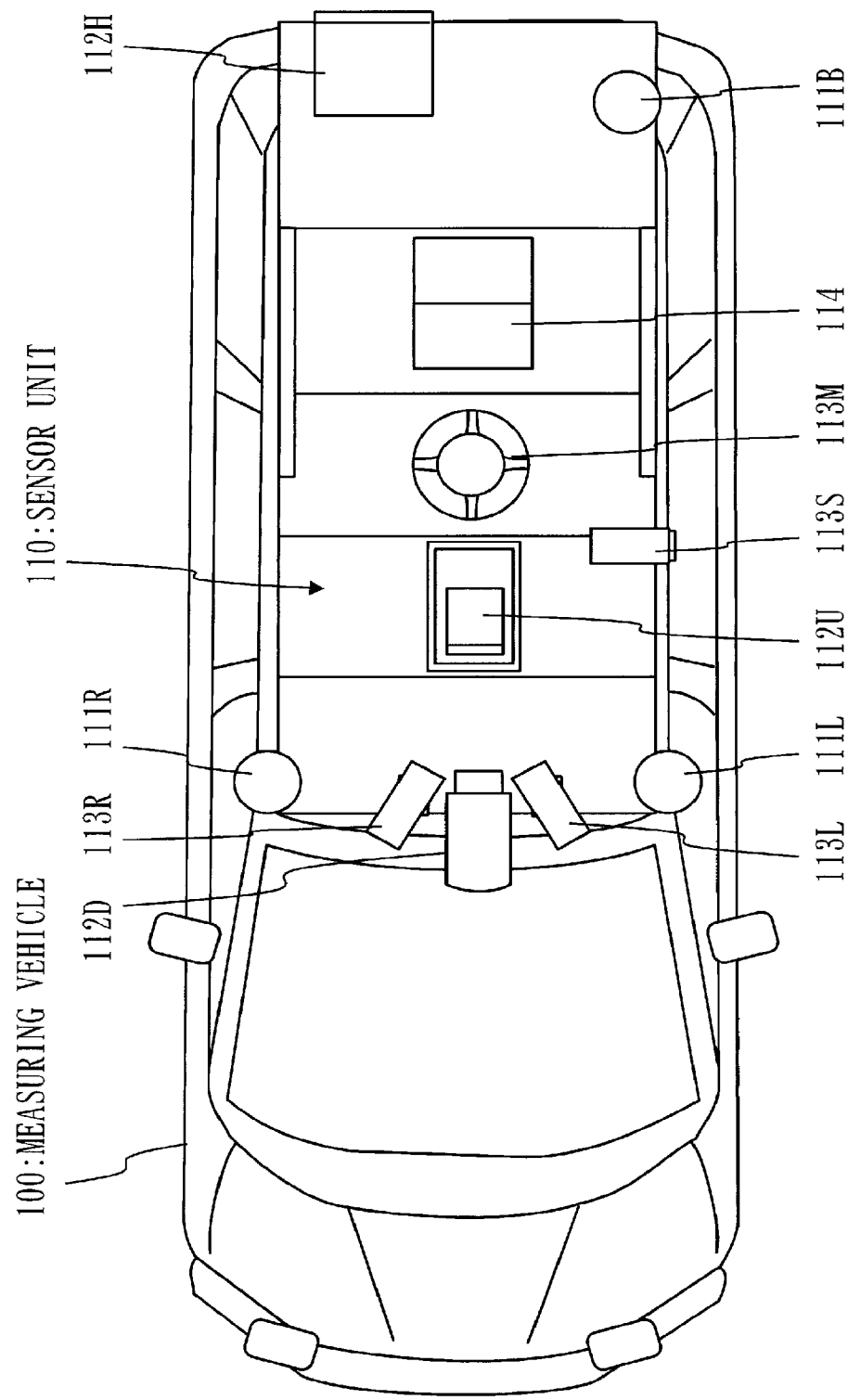
FIG. 2 is a plan view of the measuring vehicle 100 in Embodiment 1.

Based on FIG. 1 and FIG. 2, a measuring vehicle 100 is described.

FIG. 1 is a diagram of the measuring vehicle 100 viewed from left.

FIG. 2 is a diagram of the measuring vehicle 100 viewed from above.

On the measuring vehicle 100, a sensor unit 110 is mounted.

Furthermore, on the measuring vehicle 100, a measurement monitoring device 200 and an input/output device connected to the measurement monitoring device 200 are mounted.

The measuring vehicle 100 is a vehicle having the sensor unit 110 mounted thereon and is used in a mobile mapping system.

On a wheel of the measuring vehicle 100, an odometer 101 is attached.

The sensor unit 110 is fixed to the roof of the measuring vehicle 100.

The sensor unit 110 is a unit having various sensors attached thereto.

Specifically, to the sensor unit 110, sensors as described below are attached.

A plurality of GPS antennas (111L, 111R, and 111B) are attached to the sensor unit 110. When the GPS antennas are not distinguished from one another, each GPS antenna is referred to as a GPS antenna 111. GPS is an abbreviation of Global Positioning System.

The GPS antenna 111L is arranged at the left and front of the sensor unit 110.

The GPS antenna 111R is arranged at the right and front of the sensor unit 110.

The GPS antenna 111B is arranged at a back portion of the sensor unit 110.

The GPS antenna 111 is a specific example of a positioning antenna for use in a positioning system.

A plurality of laser scanners (112D, 112U, and 112H) are attached to the sensor unit 110. When the laser scanners are not distinguished from one another, each laser scanner is referred to as a laser scanner 112.

The laser scanner 112D is arranged at a front portion of the sensor unit 110, and is attached to be oriented diagonally downward to the front.

The laser scanner 112U is arranged in a recessed part provided on a center front side of the sensor unit 110, and is attached to be oriented diagonally upward to the front.

The laser scanner 112H is arranged at a back portion of the sensor unit 110, and is attached to be oriented backward.

A plurality of cameras (113L, 113R, and 113S) are attached to the sensor unit 110. When the cameras are not distinguished from one another, each camera is referred to as a camera 113.

The camera 113L is arranged at the left and front of the sensor unit 110, and is attached to be oriented diagonally downward to the left and front.

The camera 113R is arranged at the right and front of the sensor unit 110, and is attached to be oriented diagonally downward to the right and front.

The camera 113S is arranged on a center left side of the sensor unit 110, and is attached to be oriented diagonally downward to the left.

An IMU 114 is attached to the sensor unit 110. The IMU is an abbreviation of an inertial measuring unit.

The IMU 114 is arranged on a center back side of the sensor unit 110.

Figure 3:
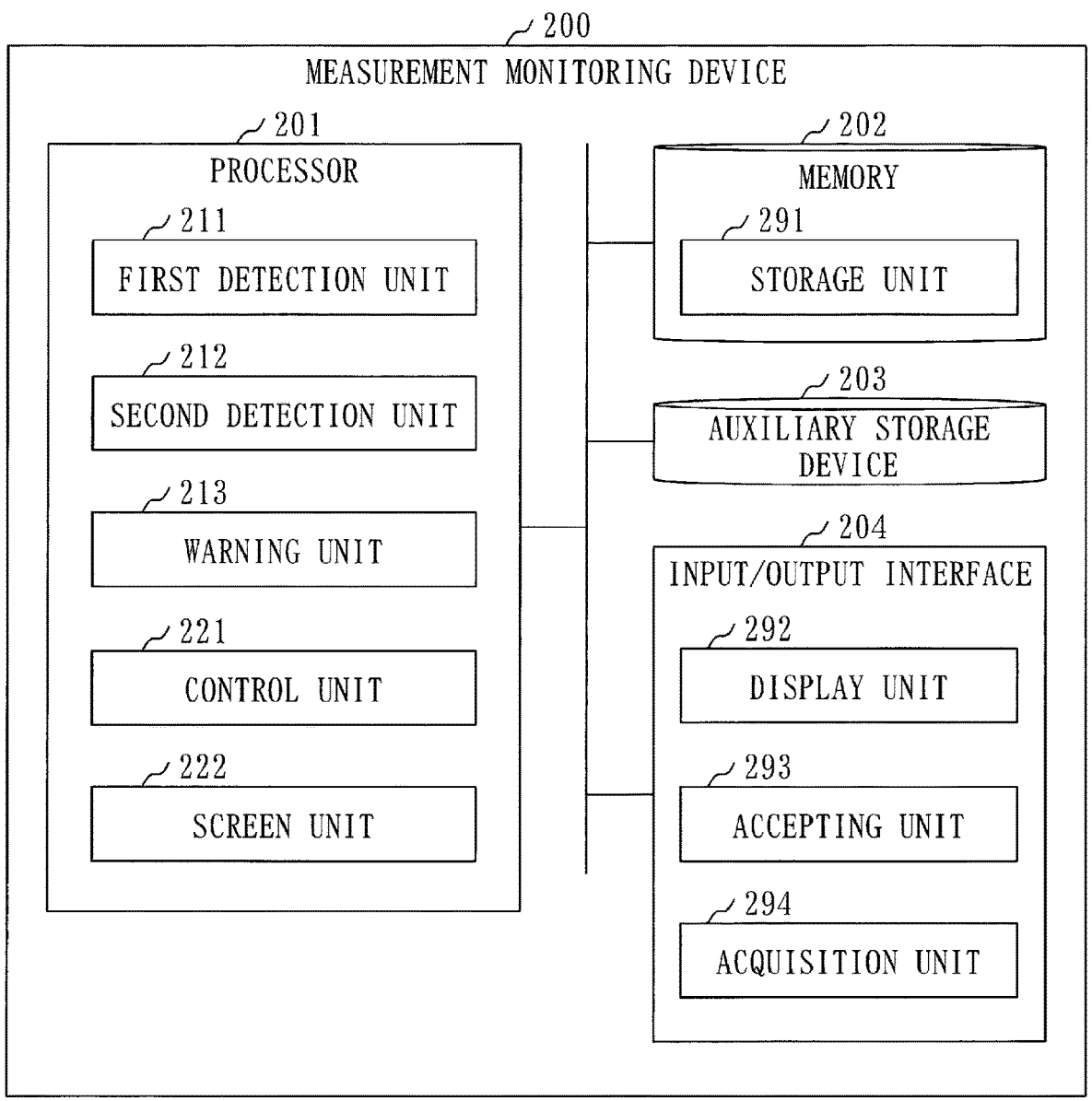
FIG. 3 is a configuration diagram of a measurement monitoring device 200 in Embodiment 1.

Based on FIG. 3, the configuration of the measurement monitoring device 200 is described.

The measurement monitoring device 200 is a computer including pieces of hardware such as a processor 201, a memory 202, an auxiliary storage device 203, and an input/output interface 204. These pieces of hardware are mutually connected via signal lines.

The processor 201 is an IC (Integrated Circuit) to perform arithmetic processing and control other hardware. For example, the processor 201 is a CPU (Central Processing Unit), a DSP (Digital Signal Processor), or a GPU (Graphics Processing Unit).

The memory 202 is a volatile storage device. The memory 202 is also called a main storage device or main memory. For example, the memory 202 is a RAM (Random Access Memory). Data stored in the memory 202 is saved in the auxiliary storage device 203 as required.

The auxiliary storage device 203 is a non-volatile storage device. For example, the auxiliary storage device 203 is a ROM (Read Only Memory), HDD (Hard Disk Drive), or flash memory. Data stored in the auxiliary storage device 203 is loaded onto the memory 202 as required.

The input/output interface 204 is a port to which the input device and the output device are connected. For example, the input/output interface 204 is an USB terminal, the input device is a keyboard and a mouse, and the output device is a display. USB is an abbreviation of Universal Serial Bus.

Furthermore, each sensor of the sensor unit 110 is connected to the input/output interface 204 via a cable.

The measurement monitoring device 200 includes components such as a first detection unit 211, a second detection unit 212, a warning unit 213, a control unit 221, and a screen unit 222. These components are implemented by software.

A measurement monitoring program is stored in the auxiliary storage device 203, the measurement monitoring program for making the computer function as the first detection unit 211, the second detection unit 212, the warning unit 213, the control unit 221, and the screen unit 222. The measurement monitoring program is loaded onto the memory 202 and is executed by the processor 201.

Further, an OS (Operating System) is stored in the auxiliary storage device 203. At least part of the OS is loaded onto the memory 202, and is executed by the processor 201.

That is, the processor 201 executes the measurement monitoring program while executing the OS.

Data acquired by executing the measurement monitoring program is stored in a storage device such as the memory 202, the auxiliary storage device 203, a register in the processor 201, or a cache memory in the processor 201.

The memory 202 functions as a storage unit 291. However, another storage device may function as the storage unit 291 in place of or together with the memory 202.

The input/output interface 204 functions as a display unit 292, an accepting unit 293, and an acquisition unit 294.

The storage unit 291, the display unit 292, the accepting unit 293, and the acquisition unit 294 are controlled by the measurement monitoring program. That is, the measurement monitoring program makes the computer function as the storage unit 291, the display unit 292, the accepting unit 293, and the acquisition unit 294.

The measurement monitoring device 200 may include a plurality of processors which replace the processor 201. The plurality of processors share the role of the processor 201.

The measurement monitoring program can be recorded on (stored in) a non-volatile recording medium such as an optical disc or flash memory in a computer-readable manner.

Description of Operation

The operation of the measurement monitoring device 200 corresponds to a measurement monitoring method. Also, the procedure of the measurement monitoring method corresponds to the procedure of the measurement monitoring program.

Figure 4:
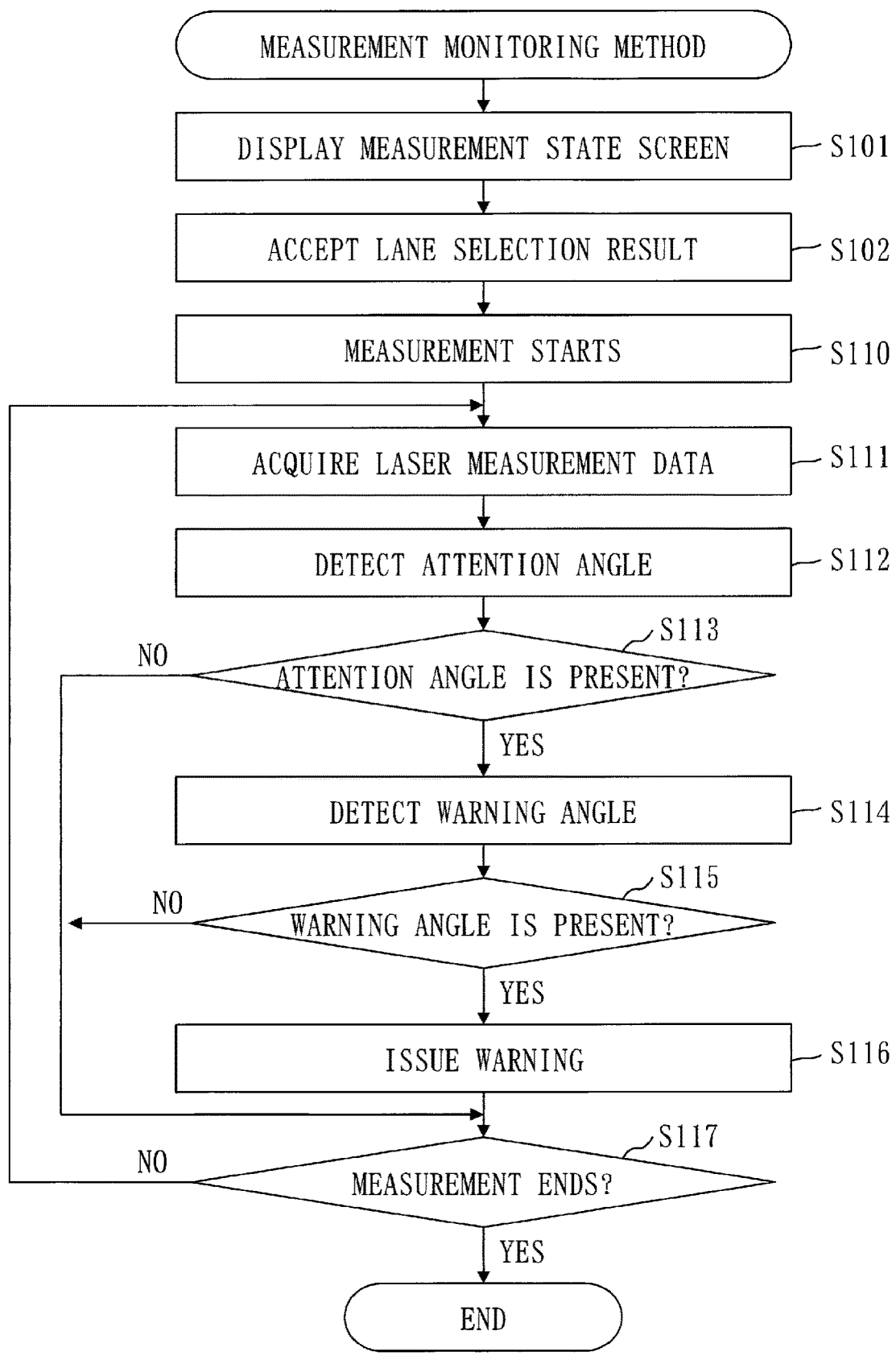
FIG. 4 is a flowchart of a measurement monitoring method in Embodiment 1.

Based on FIG. 4, the measurement monitoring method is described.

Step S101 and step S102 are performed before a road measurement by the measuring vehicle 100 is started.

At step S101, the screen unit 222 inputs data of a measurement state screen 300 into the display unit 292.

Then, the display unit 292 causes the measurement state screen 300 to be displayed on a display.

Figure 5:
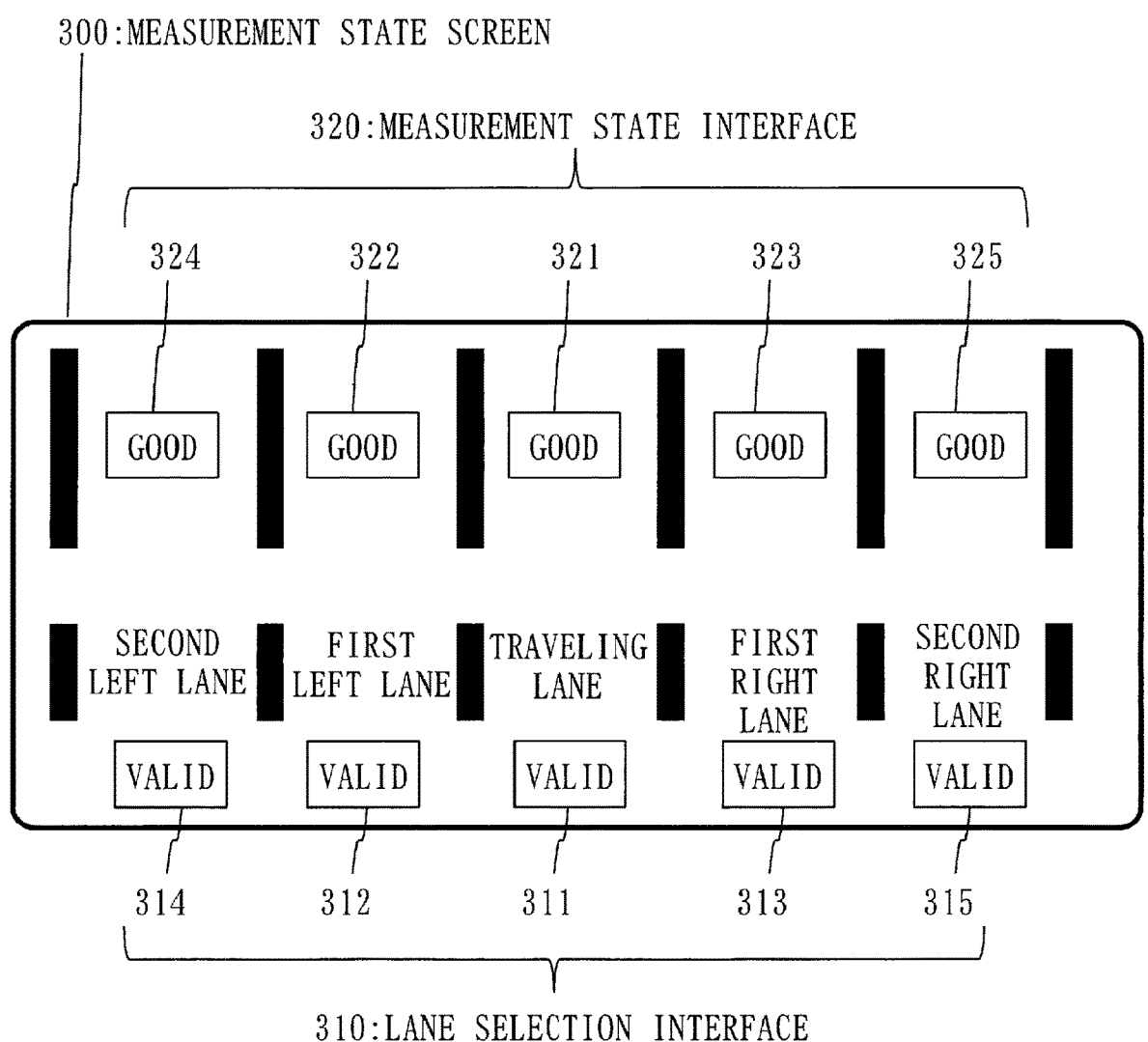
FIG. 5 is a diagram illustrating a measurement state screen 300 (initial) in Embodiment 1.

Based on FIG. 5, the measurement state screen 300 is described.

The measurement state screen 300 is a screen for notification of a measurement state.

The measurement state screen 300 depicts a virtual road.

The virtual road has a plurality of lanes.

In FIG. 5, the virtual road has five lanes.

Specifically, the virtual road has a traveling lane, a first left lane, a first right lane, a second left lane, and a second right lane.

The traveling lane is a center lane, meaning that the measuring vehicle 100 is to travel.

The first left lane means a lane at the left of the traveling lane.

The first right lane means a lane at the right of the traveling lane.

The second left lane means a lane at the left of the first left lane.

The second right lane means a lane at the right of the first right lane.

The measurement state screen 300 has a lane selection interface 310 and a measurement state interface 320.

The lane selection interface 310 is an interface for selecting a valid lane from the plurality of lanes.

The measurement state interface 320 is an interface for indicating a measurement state of each lane.

The lane selection interface 310 has a plurality of switching buttons (311 to 315) corresponding to the plurality of lanes. Each switching button indicates a state (valid or invalid) of the corresponding lane.

The switching button 311 is a button for switching the state of the traveling lane to valid or invalid.

The switching button 312 is a button for switching the state of the first left lane to valid or invalid.

The switching button 313 is a button for switching the state of the first right lane to valid or invalid.

The switching button 314 is a button for switching the state of the second left lane to valid or invalid.

The switching button 315 is a button for switching the state of the second right lane to valid or invalid.

The measurement state interface 320 has a plurality of state marks (321 to 325) corresponding to the plurality of lanes.

The state mark 321 is arranged on the traveling lane, indicating a measurement state of the traveling lane.

The state mark 322 is arranged on the first left lane, indicating a measurement state of the first left lane.

The state mark 323 is arranged on the first right lane, indicating a measurement state of the first right lane.

The state mark 324 is arranged on the second left lane, indicating a measurement state of the second left lane.

The state mark 325 is arranged on the second right lane, indicating a measurement state of the second right lane.

Referring back to FIG. 4, description of step S102 is made.

At step S102, the accepting unit 293 accepts the lane selection result by the lane selection interface 310.

The lane selection result indicates the state (valid or invalid) of each lane.

The procedure at step S102 is described.

First, a user classifies the respective lanes on the measurement state screen 300 as a valid lane and an invalid lane.

The valid lane is a lane that is present on a measurement road.

The invalid lane is a lane that is absent on the measurement road.

The measurement road is a road the measuring vehicle 100 travels. That is, the measurement road is a road to be measured by the measuring vehicle 100.

Next, the user operates the lane selection interface 310 by using the input device.

Specifically, by pressing down each of the switching buttons (311 to 315) by operating the mouse, the user switches the state of each lane.

Then, the accepting unit 293 acquires the lane selection result from the lane selection interface 310. The storage unit 291 stores the lane selection result.

Figure 6:
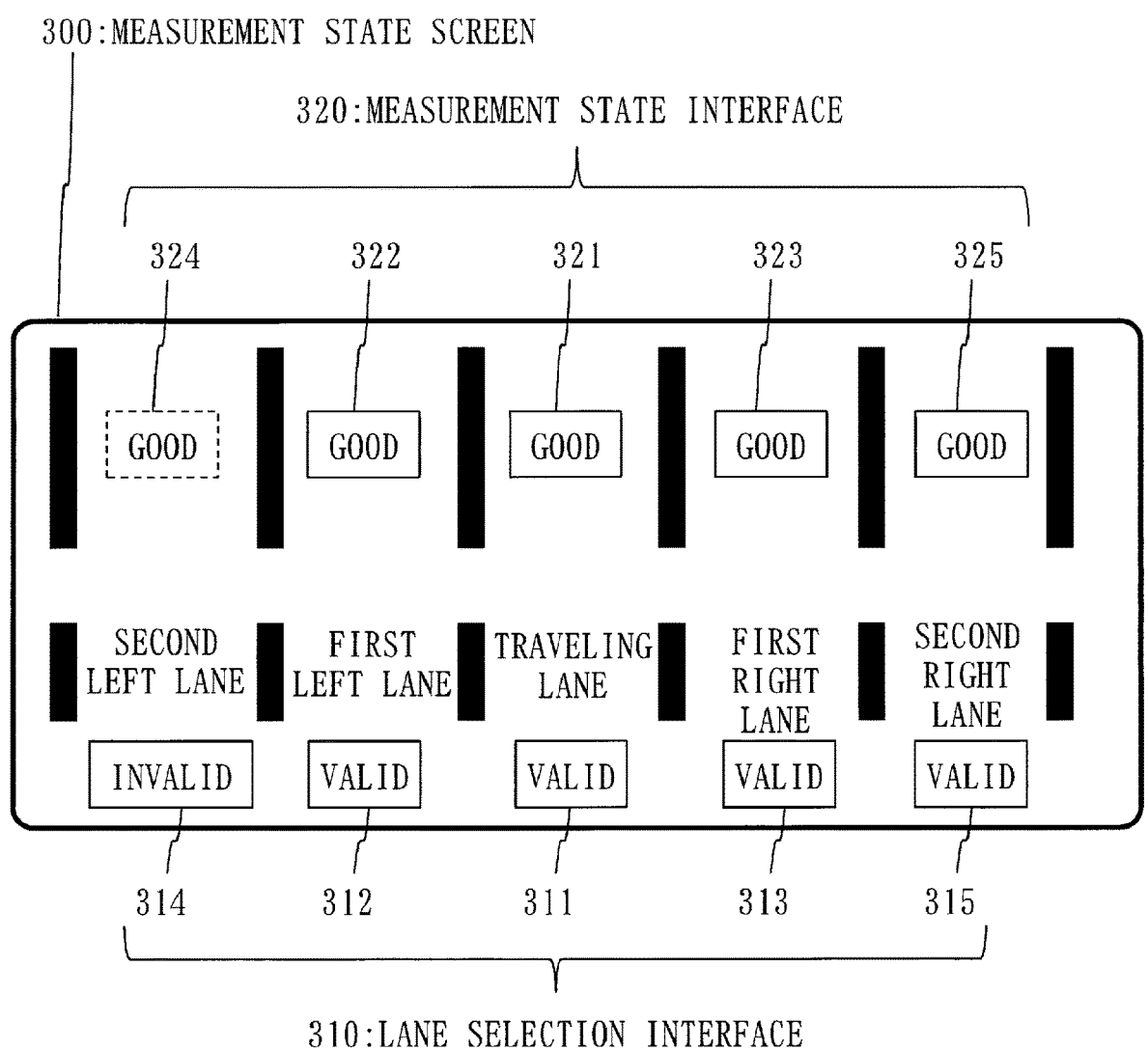
FIG. 6 is a diagram illustrating the measurement state screen 300 (select) in Embodiment 1.

Based on FIG. 6, an example of operation of the lane selection interface 310 is described.

When the measurement load has four lanes and the second left lane is absent on the measurement road, the user makes the state of the second left lane invalid by pressing down the switching button 314.

When the state of the second left lane is made invalid, the screen unit 222 updates the data on the measurement state screen 300, and the display unit 292 displays the measurement state screen 300 after the update. This changes the state mark 324 to be in an invalid state.

Referring back to FIG. 4, description continues from step S110.

At step S110, a driver drives the measuring vehicle 100 to cause the measuring vehicle 100 to travel the measurement road. On the measuring vehicle 100, the user is riding.

The user inputs a measurement start instruction to the measurement monitoring device 200 by using the input device.

The accepting unit 293 accepts the measurement start instruction, and the control unit 221 starts each sensor of the sensor unit 110.

Each sensor in the sensor unit 110 starts a measurement and outputs measurement data. The outputted measurement data is inputted into the measurement monitoring device 200. The measurement data is data acquired by measurement.

Specifically, the laser scanner 112 repeatedly performs a laser measurement for acquiring laser measurement data, and outputs the laser measurement data for every laser measurement. Then, each piece of laser measurement data is inputted to the measurement monitoring device 200.

The laser measurement data indicates a measurement distance and a measurement time for each irradiation angle of laser light.

In a laser measurement, the laser scanner 112 irradiates laser light in each direction, the laser light is reflected from the irradiation destination to return to the laser scanner 112, and the laser scanner 112 receives the laser light from each direction. Then, the laser scanner 112 measures, for each irradiation angle of the laser light, a round-trip time from a time of irradiation to a time of reception of the laser light, and calculates, for each irradiation angle of the laser light, a distance from the laser scanner 112 to a reflection point based on the round-trip time. The calculated distance is a measurement distance.

At step S111, the acquisition unit 294 acquires laser measurement data every time a laser measurement is performed.

Specifically, for each laser measurement, the acquisition unit 294 accepts the inputted laser measurement data. Then, for each laser measurement, the storage unit 291 stores the accepted laser measurement data.

At step S112, the first detection unit 211 detects an attention angle based on the acquired laser measurement data.

The attention angle is an irradiation angle corresponding to a measurement distance not included in a standard distance range.

The standard distance range is a range of the measurement distance and is determined for each irradiation angle.

The standard distance range can be represented by the following equation. A standard distance is a distance from the laser scanner 112 to a road surface, and is predetermined for each irradiation angle. An allowable difference is a value indicating a distance and is determined in advance.

(Standard distance−allowable difference)≤standard distance range≤(standard distance+allowable difference)

Figure 7:
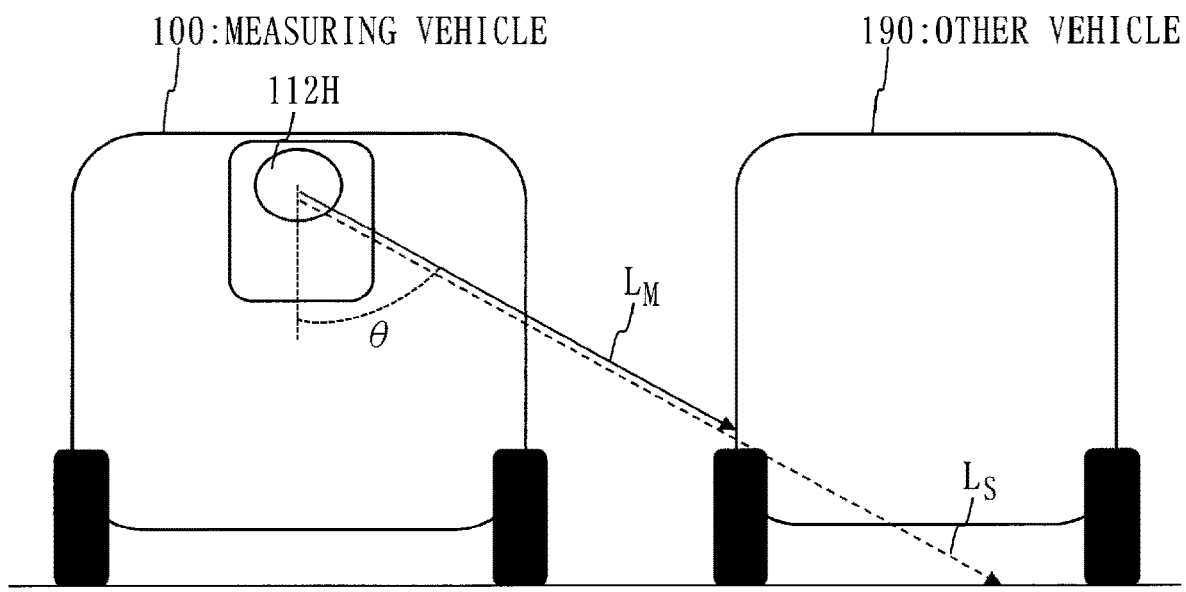
FIG. 7 is a diagram illustrating an attention angle θ in Embodiment 1.

Based on FIG. 7, an attention angle θ is described.

FIG. 7 is the measuring vehicle 100 viewed from the back.

When another vehicle 190 is present in a direction in which the laser light is irradiated, the laser light does not reach the road surface but is reflected from the other vehicle 190. Thus, the measurement distance is extremely short compared with a distance (standard distance) from the laser scanner 112H to the road surface.

For example, it is assumed that the laser light irradiated at the irradiation angle θ is reflected from the other vehicle 190. In this case, a difference between a measurement distance $L_M$ and a standard distance $L_S$ exceeds the allowable difference. Therefore, the irradiation angle θ matches the attention angle.

Figure 8:
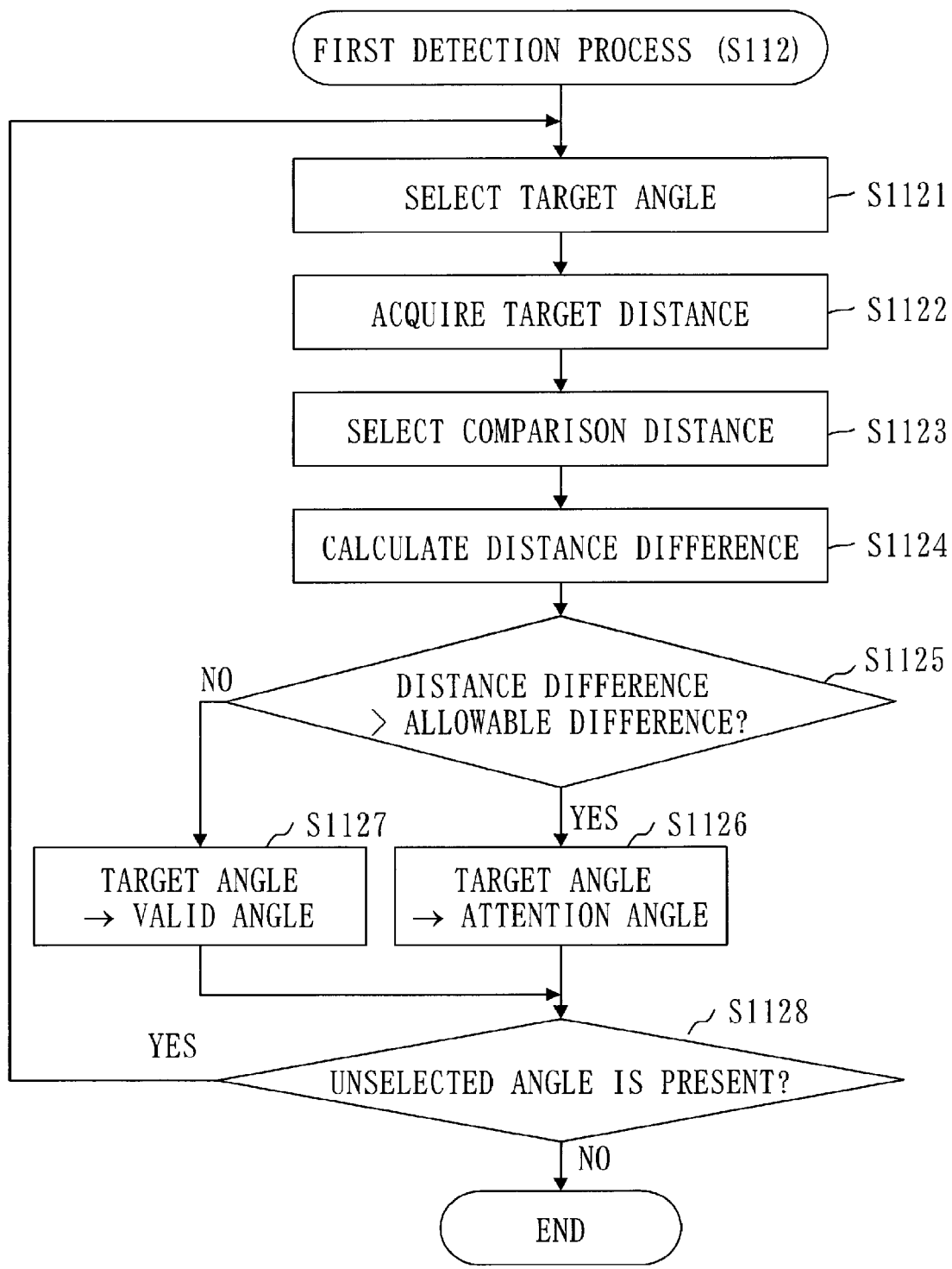
FIG. 8 is a flowchart of a first detection process (S112) in Embodiment 1.

Based on FIG. 8, the procedure of a first detection process (S112) is described.

At step S1121, the first detection unit 211 selects one unselected irradiation angle. The selected irradiation angle is referred to as a target angle in FIG. 8.

At step S1122, the first detection unit 211 acquires the measurement distance of the target angle from the present laser measurement data. The acquired measurement distance is referred to as a target distance in FIG. 8.

Also, the first detection unit 211 acquires a measurement time of the target angle from the present laser measurement data.

At step S1123, the first detection unit 211 selects a standard distance of the target angle. The selected standard distance is referred to as a comparison distance in FIG. 8.

At step S1124, the first detection unit 211 calculates a difference between the target distance and the comparison distance. The calculated difference is referred to as a distance difference in FIG. 8.

Specifically, the first detection unit 211 substrates the target distance from the comparison distance. The acquired value is a distance difference.

At step S1125, the first detection unit 211 compares the distance difference with the allowable difference.

When the distance difference is larger than the allowable difference, the process proceeds to step S1126.

When the distance difference is equal to or smaller than the allowable difference, the process proceeds to step S1127.

At step S1126, the first detection unit 211 classifies the target angle as the attention angle.

Specifically, the first detection unit 211 operates as follows.

The first detection unit 211 determines whether an attention angle with the same angle as the target angle has been registered in the storage unit 291.

If an attention angle with the same angle as the target angle has not been registered in the storage unit 291, the first detection unit 211 registers the attention angle with the same angle as the target angle in the storage unit 291. Furthermore, the first detection unit 211 registers a start time and a present time in the storage unit 291 in association with that attention angle. The registered start time and the registered present time are measurement times of the target distance.

If an attention angle with the same angle as the target angle has been registered in the storage unit 291, the first detection unit 211 updates the present time associated with that attention angle to a measurement time of the target distance.

At step S1127, the first detection unit 211 classifies the target angle as a valid angle.

Specifically, if an attention angle with the same angle as the target angle has been registered in the storage unit 291, the first detection unit 211 deletes that attention angle and information associated with that attention angle from the storage unit 291.

At step S1128, the first detection unit 211 determines whether an unselected irradiation angle is present. The unselected irradiation angle is referred to as an unselected angle in FIG. 8.

When an unselected angle is present, the process proceeds to step S1121.

When an unselected angle is absent, the process ends.

Referring back to FIG. 4, description continues from step S113.

At step S113, the first detection unit 211 determines whether an attention angle is present.

Specifically, the first detection unit 211 determines whether an attention angle has been registered in the storage unit 291.

When an attention angle is present, the process proceeds to step S114.

When an attention angle is absent, the process proceeds to step S117.

At step S114, the second detection unit 212 detects a warning angle.

The warning angle is an irradiation angle matching the attention angle for a time longer than an allowable time.

Figure 9:
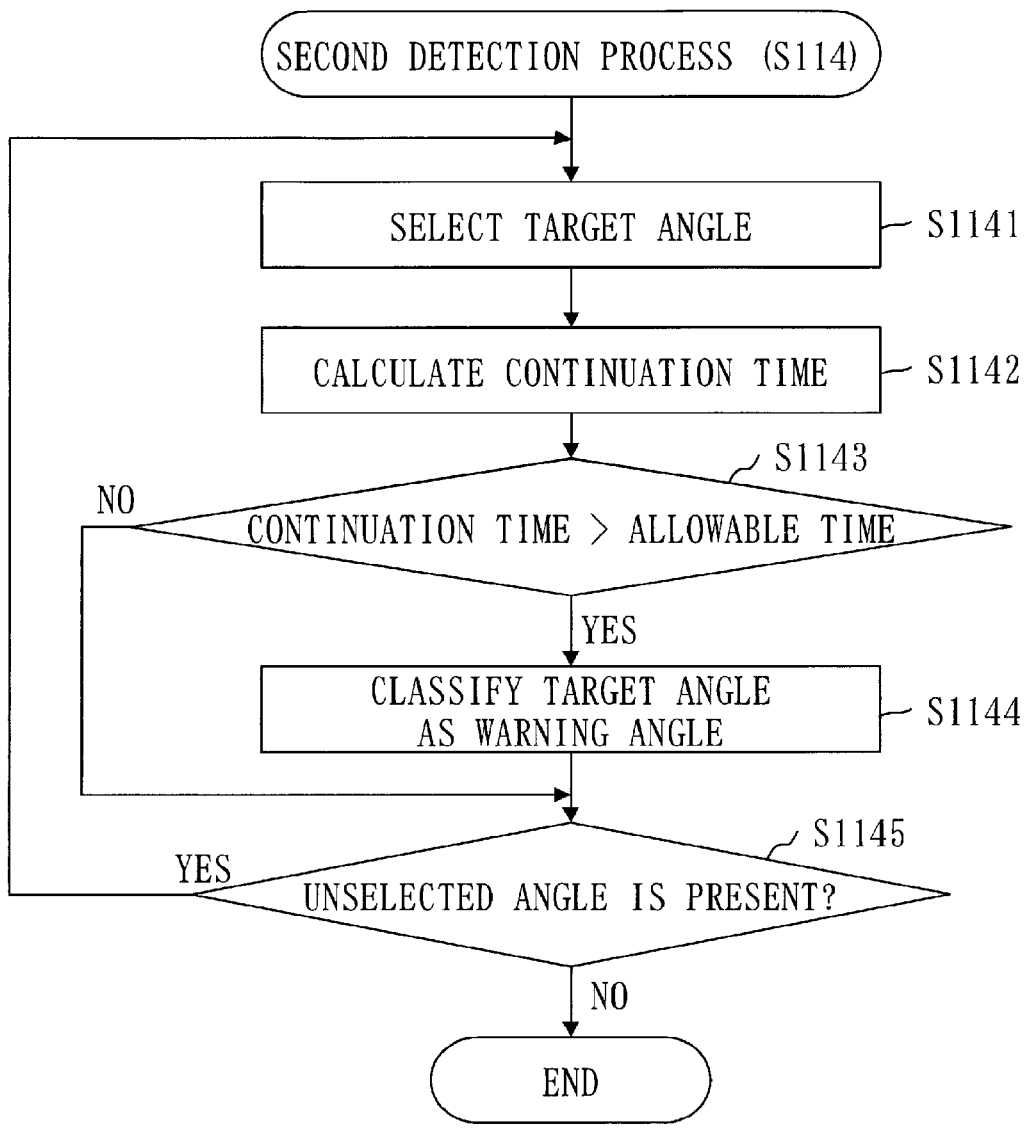
FIG. 9 is a flowchart of a second detection process (S114) in Embodiment 1.

Based on FIG. 9, the procedure at step S114 is described.

At step S1141, the second detection unit 212 selects one unselected attention angle. The selected attention angle is a target angle in FIG. 9.

At step S1142, the second detection unit 212 calculates a continuation time of the target angle.

Specifically, the second detection unit 212 acquires a start time of the target angle and a present time of the target angle from the storage unit 291. Then, the second detection unit 212 calculates a time from the start time to the present time. The calculated time is a continuation time of the target angle.

At step S1143, the second detection unit 212 compares the continuation time with an allowable time.

The allowable time is a predetermined time.

When the continuation time is longer than the allowable time, the process proceeds to step S1144.

When the continuation time is equal to or shorter than the allowable time, the process proceeds to step S1145.

At step S1144, the second detection unit 212 classifies the target angle as the warning angle.

Specifically, the second detection unit 212 registers a warning flag in the storage unit 291 in association with the target angle.

At step S1145, the second detection unit 212 determines whether an unselected attention angle is present. The unselected attention angle is referred to as an unselected angle in FIG. 9.

When an unselected angle is present, the process returns to step S1141.

When an unselected angle is absent, the process ends.

Referring back to FIG. 4, description continues from step S115.

At step S115, the second detection unit 212 determines whether a warning angle is present.

Specifically, the second detection unit 212 determines whether a warning angle associated with the warning flag has been registered in the storage unit 291.

When a warning angle is present, the process proceeds to step S116.

When a warning angle is absent, the process proceeds to step S117.

At step S116, the warning unit 213 issues a warning.

Specifically, the warning unit 213 selects a warning lane from the plurality of lanes on the measurement state screen 300 and highlights the warning lane on the measurement state screen 300.

The warning lane is a lane corresponding to the warning angle.

Figure 10:
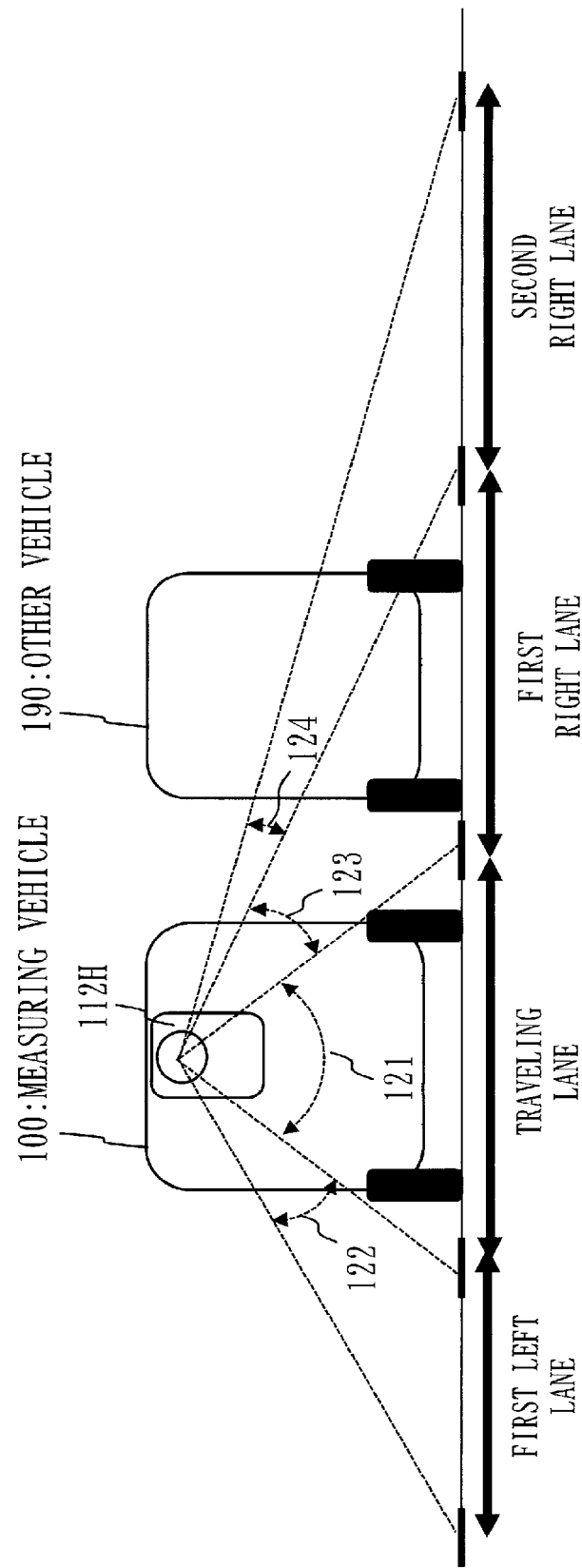
FIG. 10 is a descriptive diagram of a warning lane in Embodiment 1.

Based on FIG. 10, the warning lane is described.

FIG. 10 is the measurement road viewed from the back of the measuring vehicle 100.

Each lane is associated with an angle range (121 to 124). The angle range is a range of the irradiation angle.

The angle range 121 is an angle range corresponding to the traveling lane.

The angle range 122 is an angle range corresponding to the first left lane.

The angle range 123 is an angle range corresponding to the first right lane.

The angle range 124 is an angle range corresponding to the second right lane.

When the other vehicle 190 is present rightward at the back of the measuring vehicle 100 and laser light from the laser scanner 112H is continuously blocked by the other vehicle 190, an irradiation angle included in the angle range 123 matches the warning angle. Furthermore, an irradiation angle included in the angle range 124 matches the warning angle. In that case, the first right lane and the second right lane match warning lanes.

Figure 11:
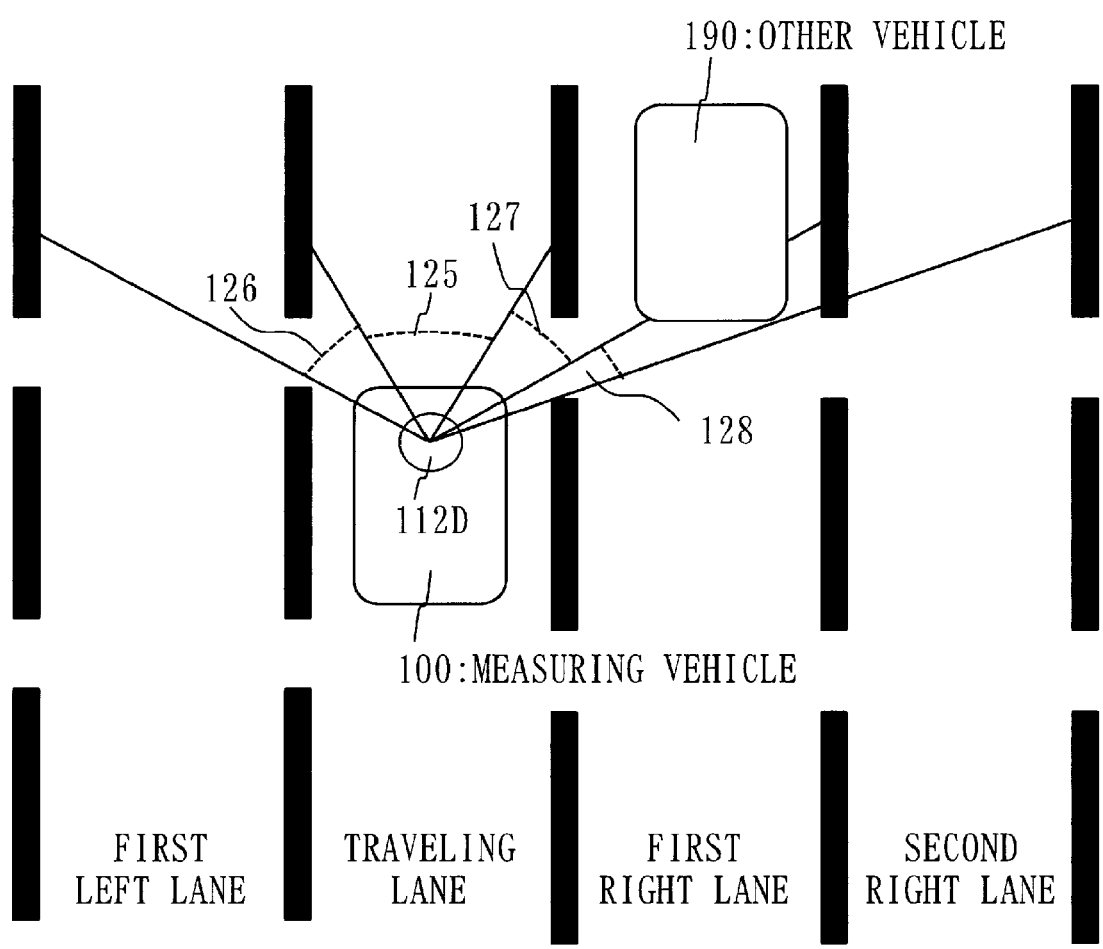
FIG. 11 is a descriptive diagram of the warning lane in Embodiment 1.

Based on FIG. 11, the warning lane is described.

FIG. 11 illustrates a measurement road viewed from above.

Each lane corresponds to an angle range (125 to 128).

The angle range 125 is an angle range corresponding to the traveling lane.

The angle range 126 is an angle range corresponding to the first left lane.

The angle range 127 is an angle range corresponding to the first right lane.

The angle range 128 is an angle range corresponding to the second right lane.

When the other vehicle 190 is present rightward at the front of the measuring vehicle 100 and laser light from the laser scanner 112D is continuously blocked by the other vehicle 190, an irradiation angle included in the angle range 127 matches the warning angle. Furthermore, an irradiation angle included in the angle range 128 matches the warning angle. In that case, the first right lane and the second right lane match warning lanes.

Figure 12:
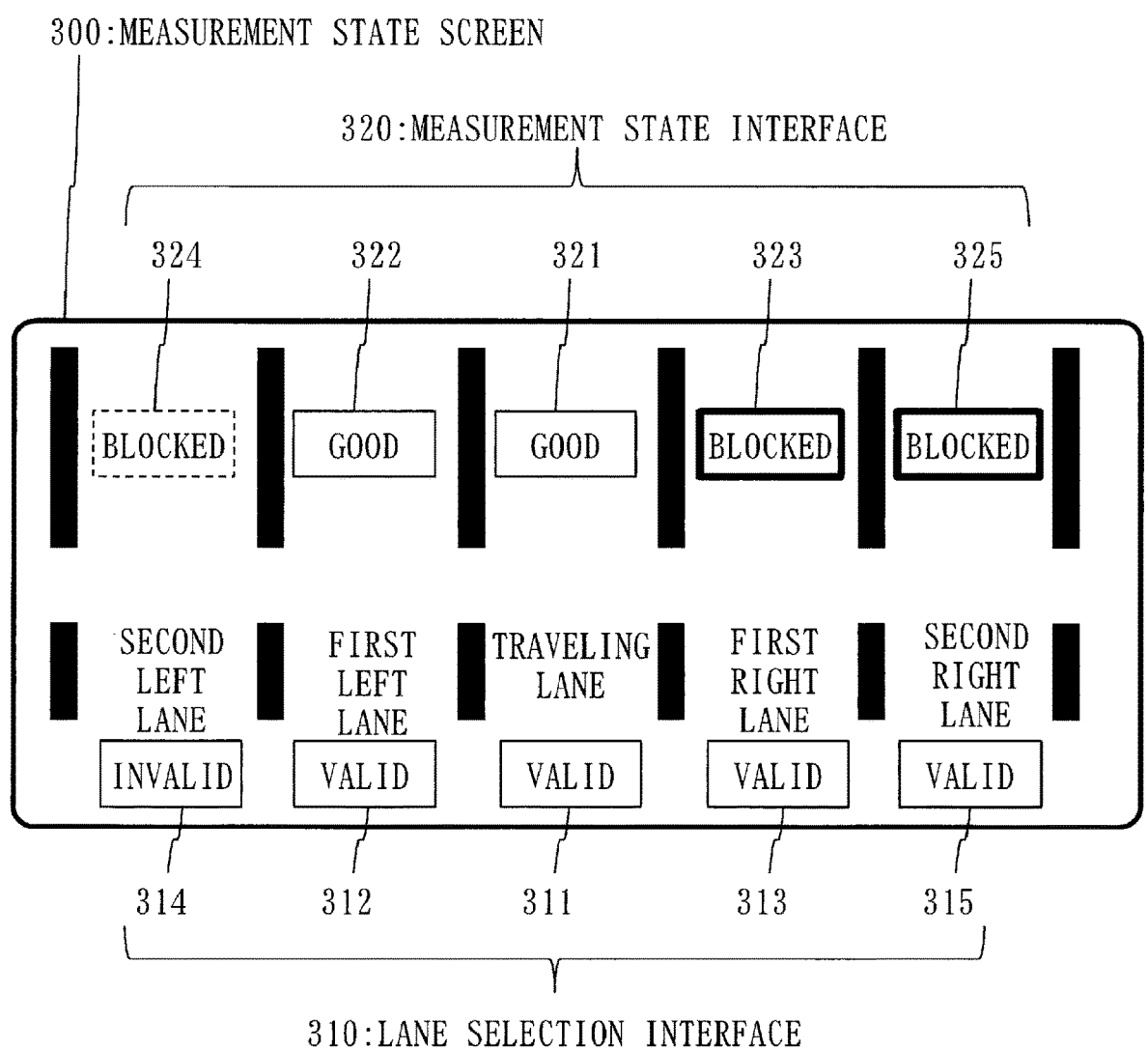
FIG. 12 is a diagram illustrating the measurement state screen 300 (warning) in Embodiment 1.

Based on FIG. 12, a highlighted example of the warning lane is described.

FIG. 12 illustrates the measurement state screen 300 when the first right lane and the second right lane are warning lanes.

The state mark 323 is arranged on the first right lane, and the state mark 325 is arranged on the second right lane.

The state mark 323 indicates that the first right lane is in a blocked state, and the state mark 325 indicates that the second right lane is in a blocked state.

The state mark 323 and the state mark 325 are displayed so as to be highlighted.

Figure 13:
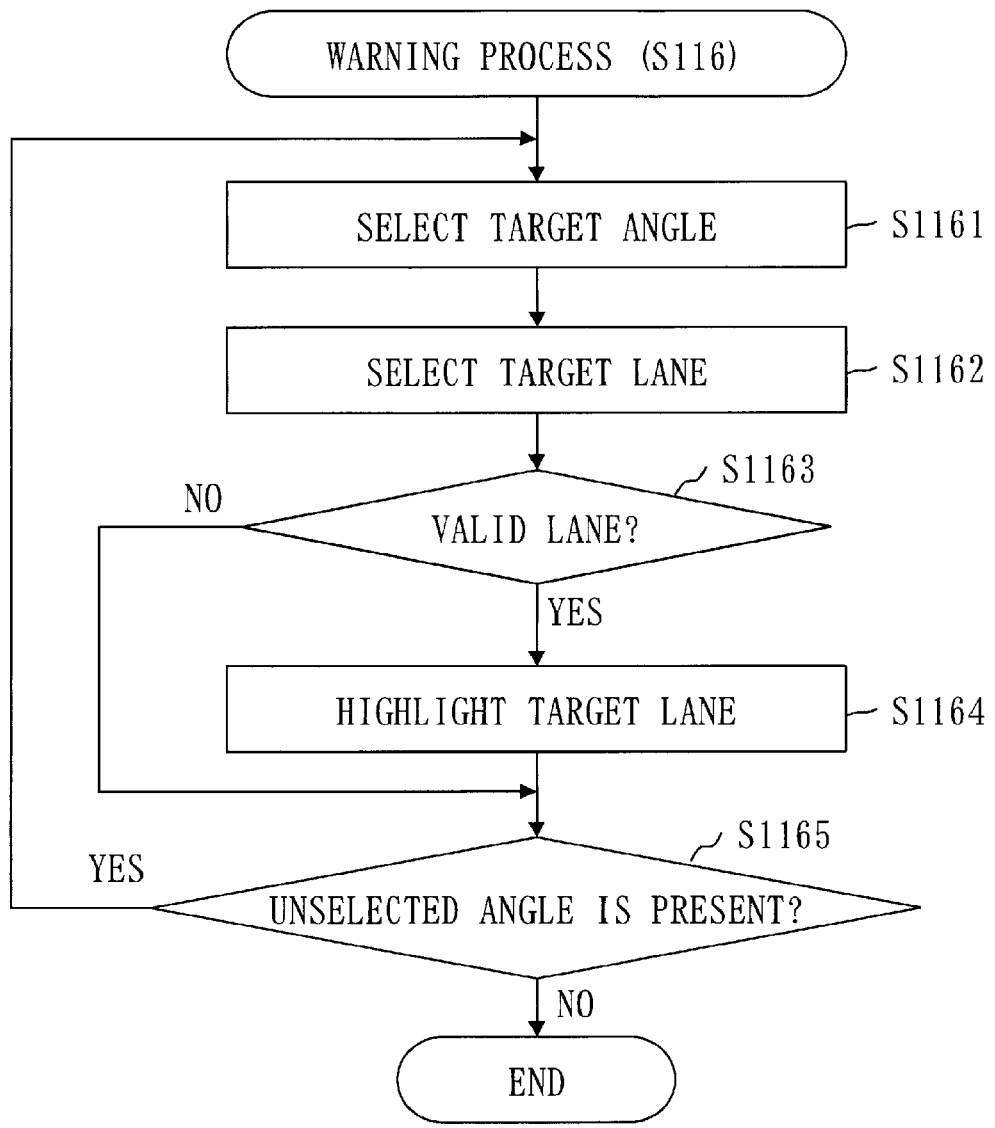
FIG. 13 is a flowchart of a warning process (S116) in Embodiment 1.

Based on FIG. 13, the procedure of the warning process (S116) is described.

At step S1161, the warning unit 213 selects one unselected warning angle. The selected warning angle is referred to as a target angle in FIG. 13.

At step S1162, the warning unit 213 selects a lane corresponding to the target angle. The selected lane is referred to as a target lane in FIG. 13.

Specifically, an angle range is predetermined for each lane. And, the warning unit 213 selects an angle range including the target angle. A lane corresponding to the selected angle range is a target lane.

At step S1163, based on the lane selection result (refer to step S102 of FIG. 4), the warning unit 213 determines whether the target lane is a valid lane.

When the target lane is a valid lane, the process proceeds to step S1164.

When the target lane is an invalid lane, the process proceeds to step S1165. In this case, the warning unit 213 does not highlight the target lane on the measurement state screen 300.

At step S1164, the warning unit 213 highlights the target lane on the measurement state screen 300.

Specifically, the warning unit 213 inputs an instruction for highlighting the target lane to the screen unit 222. The screen unit 222 updates the data on the measurement state screen 300 to data in a state in which the warning lane is highlighted, and inputs the data after the update to the display unit 292. Then, the display unit 292 causes the measurement state screen 300 to be displayed on the display based on the data after the update.

At step S1165, the warning unit 213 determines whether an unselected warning angle is present. The unselected warning angle is referred to as an unselected angle in FIG. 13.

When an unselected angle is present, the process proceeds to step S1161.

When an unselected angle is absent, the process ends.

Referring back to FIG. 4, description of step S117 is made.

At step S117, when traveling the measurement road ends, the user inputs a measurement end instruction to the measurement monitoring device 200 by using the input device.

The accepting unit 293 accepts the measurement end instruction, and the control unit 221 causes each sensor of the sensor unit 110 to stop. This ends the measurement.

When the measurement ends, the process ends.

When the measurement does not end, the process proceeds to step S111.

*Supplemental Remarks of Embodiment 1*

The measuring vehicle 100 includes the laser scanners (112D and 112H) at the front and back. With this, even if laser light from one laser scanner 112 is blocked, the road surface can be measured with laser light from the other laser scanner 112.

For example, when the other vehicle 190 is traveling at the right and front of the measuring vehicle 100, even if laser light from the laser scanner 112D is blocked by the other vehicle 190, the road surface on the right lane can be measured with laser light from the laser scanner 112H.

Also, when the other vehicle 190 is traveling at the right and back of the measuring vehicle 100, even if laser light from the laser scanner 112H is blocked by the other vehicle 190, the road surface on the right lane can be measured with laser light from the laser scanner 112D.

Figure 14:
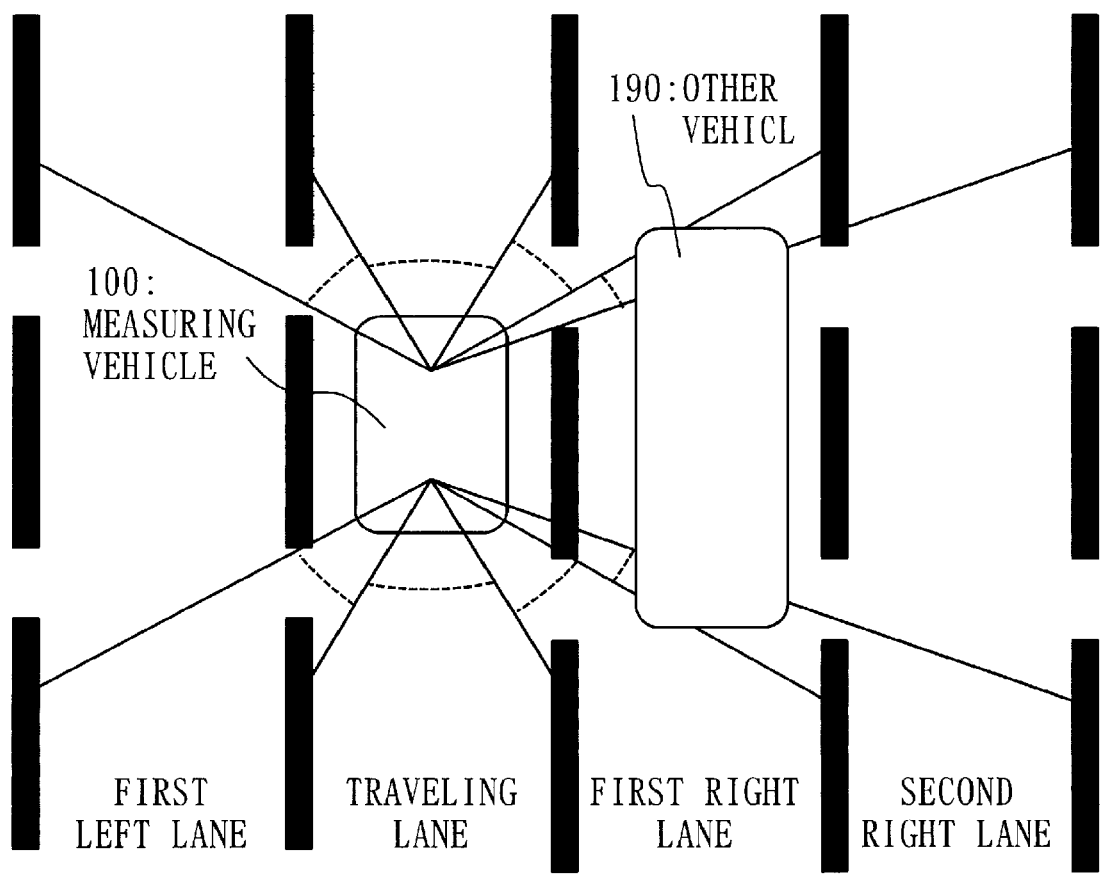
FIG. 14 is a diagram illustrating an example of a warning state in Embodiment 1.

FIG. 14 illustrates a state in which another large vehicle 190 is traveling alongside of the measuring vehicle 100.

In this state, since laser light from any of the laser scanners (112D and 112H) is blocked by the other vehicle 190, the road surface cannot be measured.

Thus, the warning unit 213 may issue a warning when the same warning lane (and attention lane) is detected for both of the laser scanners (112D and 112H).

*Effects of Embodiment 1*

The measurement monitoring device 200 can warn, on a real-time basis, about a state in which a laser measurement is not being correctly performed due to a vehicle traveling alongside or the like.

This allows the user to know, on a real-time basis, the state in which a laser measurement is not being correctly performed. And, with a scheme of changing the traveling speed by the driver or the like, this state can be avoided. That is, it is possible to return within a shorter time to a state in which a laser measurement can be correctly performed.

As a result, a range in which a laser measurement has not been correctly performed falls within an allowable range, and a measurement failure or trouble to perform double measurements can be reduced.

Figure 15:
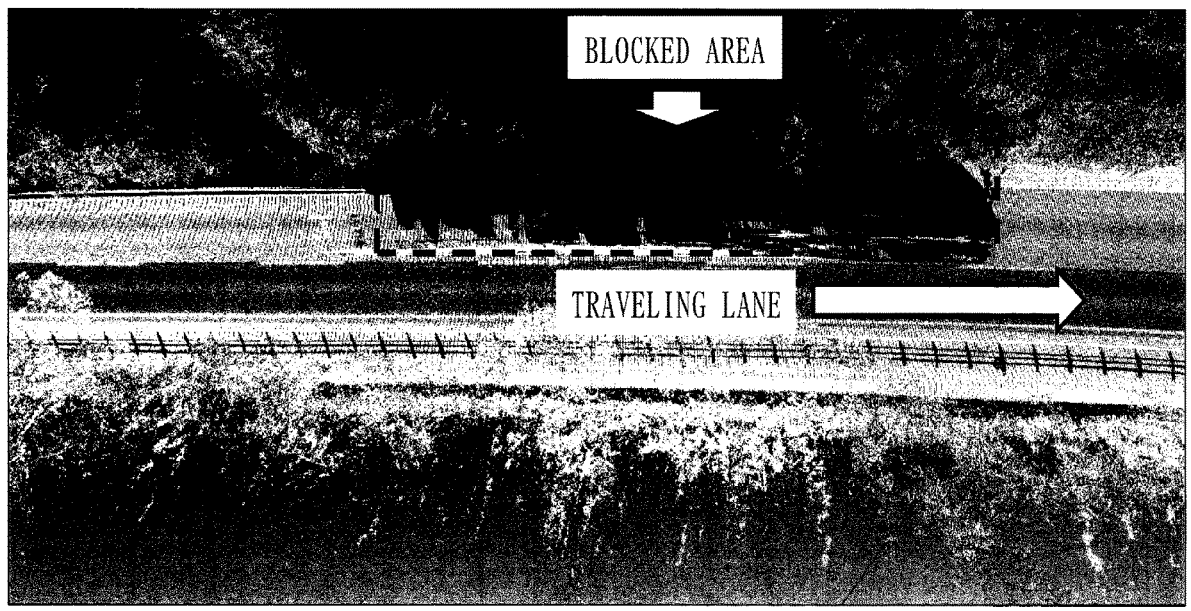
FIG. 15 is a point-cloud image illustrating a blocked area where the measurement monitoring method in Embodiment 1 is not performed.
Figure 17:
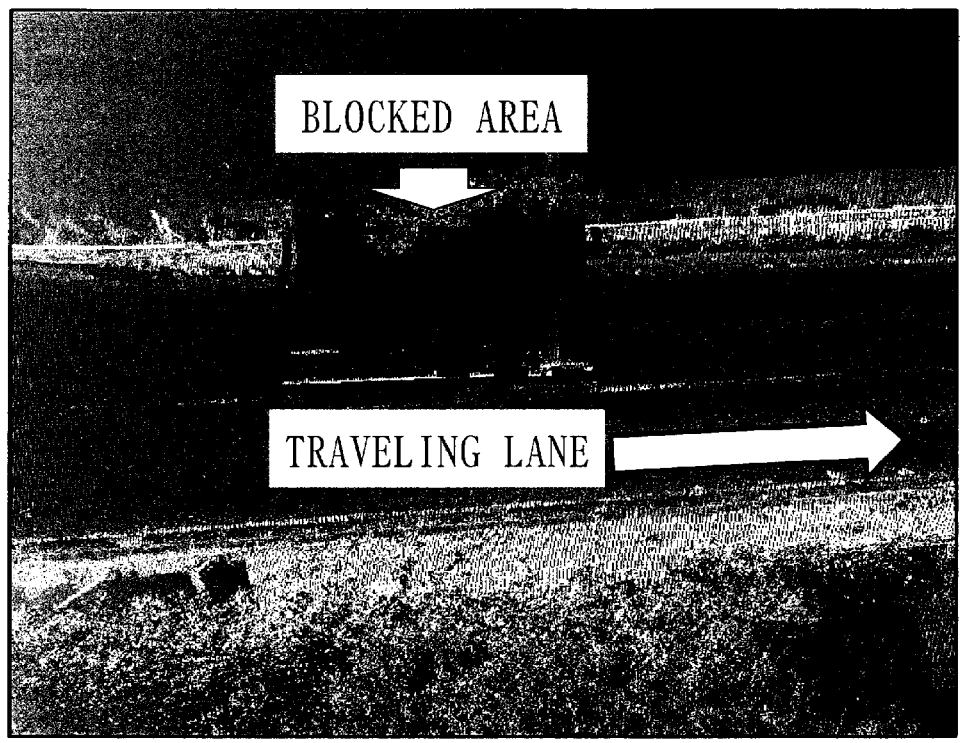
FIG. 17 is a point-cloud image illustrating a blocked area in Embodiment 1.

FIG. 15 and FIG. 17 each illustrate a point-cloud image. The point-cloud image is an image representing a collection of reflection points of laser light. Each reflection point is represented by a figure such as a circle or triangle.

Figure 16:
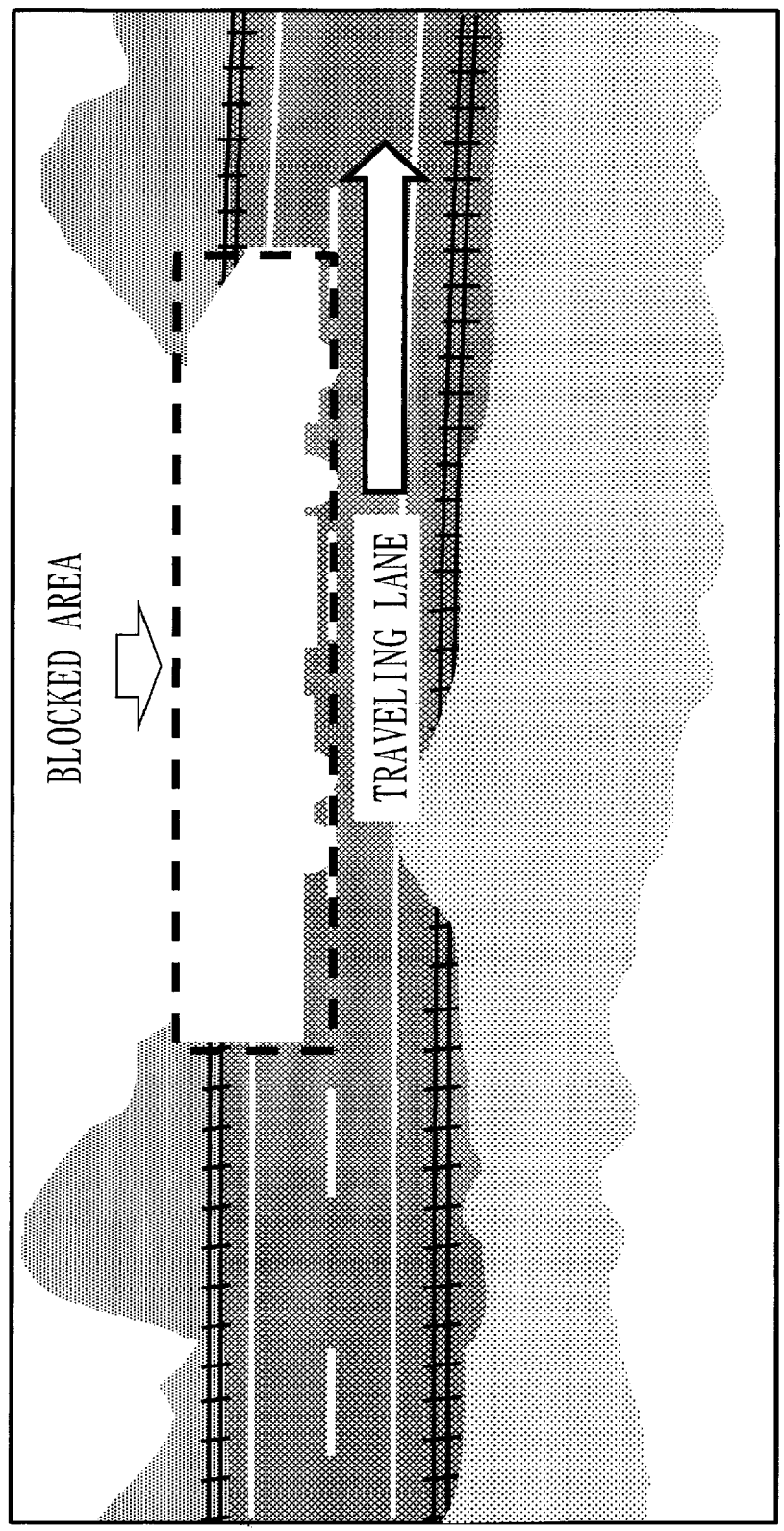
FIG. 16 is a picture representing the blocked area where the measurement monitoring method in Embodiment 1 is not performed.
Figure 18:
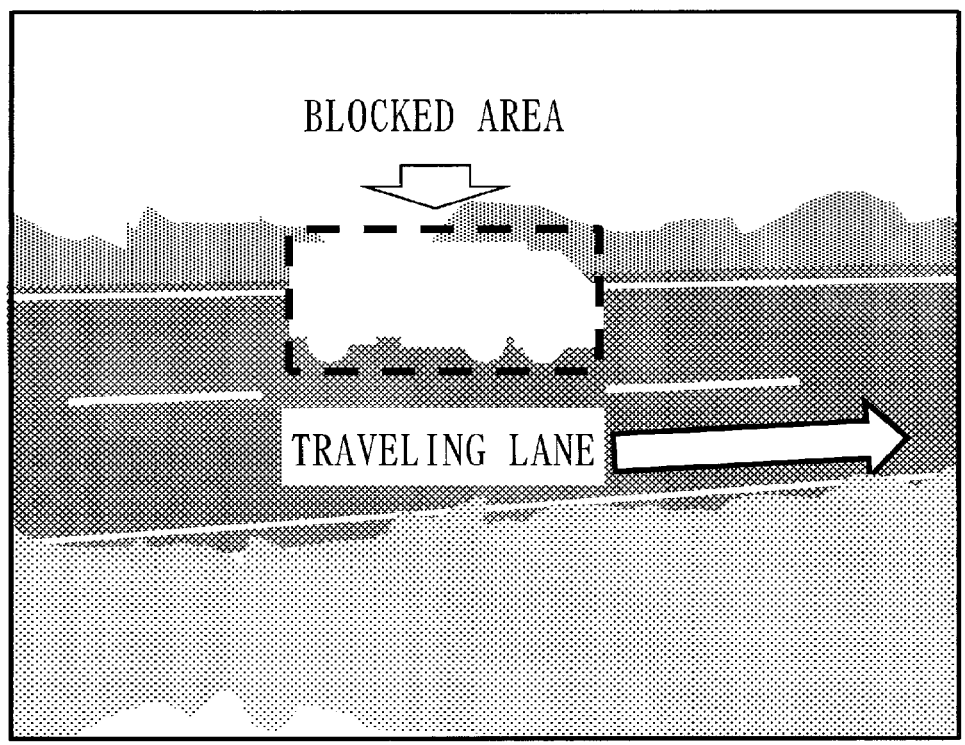
FIG. 18 is a picture representing the blocked area in Embodiment 1.

FIG. 16 is a picture in which a point-cloud image of FIG. 15 is rendered, and FIG. 18 is a picture in which a point-cloud image of FIG. 17 is rendered.

FIG. 15 illustrates the point-cloud image when the vehicle traveling alongside is not noticed and a blocked area is spread. When the blocked area is spread, the blocked area exceeds the allowable range, and thus a remeasurement is required.

FIG. 17 illustrates the point-cloud image when the vehicle traveling alongside is noticed by the warning from the measurement monitoring device 200 and expansion of the blocked area is prevented. When expansion of the blocked area is prevented, the blocked area falls within the allowable range, and thus a remeasurement is not required.

The measurement monitoring device 200 can issue a warning also when correct laser measurement data cannot be acquired due to an event other than blocking by the other vehicle.

Specifically, the measurement monitoring device 200 can issue a warning in the following events.

When the ground is wet, correct laser measurement data may not be acquired due to a reflection state of laser light. This can occur also when a snowy road is measured. Also, if the road surface has just finished being paved, correct laser measurement data may not be acquired due to black reflection. In this case, the measurement distance indicates an error value and, therefore, a warning is issued.

When a droplet of water or dust is attached on a laser surface, a laser measurement cannot be performed. In this case, the measurement distance indicates an error value and, therefore, a warning is issued. That is, it is possible to give a notice of an anomaly in the laser scanner 112 or an anomaly such as attachment of dust.

For example, when the measurement distance indicates an error value or an abnormally short distance in a certain angle range, a warning is issued. A point of 30 centimeters from the laser scanner 112D is on the measuring vehicle, and thus a measurement distance equal to or shorter than 30 centimeters is an abnormally short distance.

Embodiment 2

Figure 19:
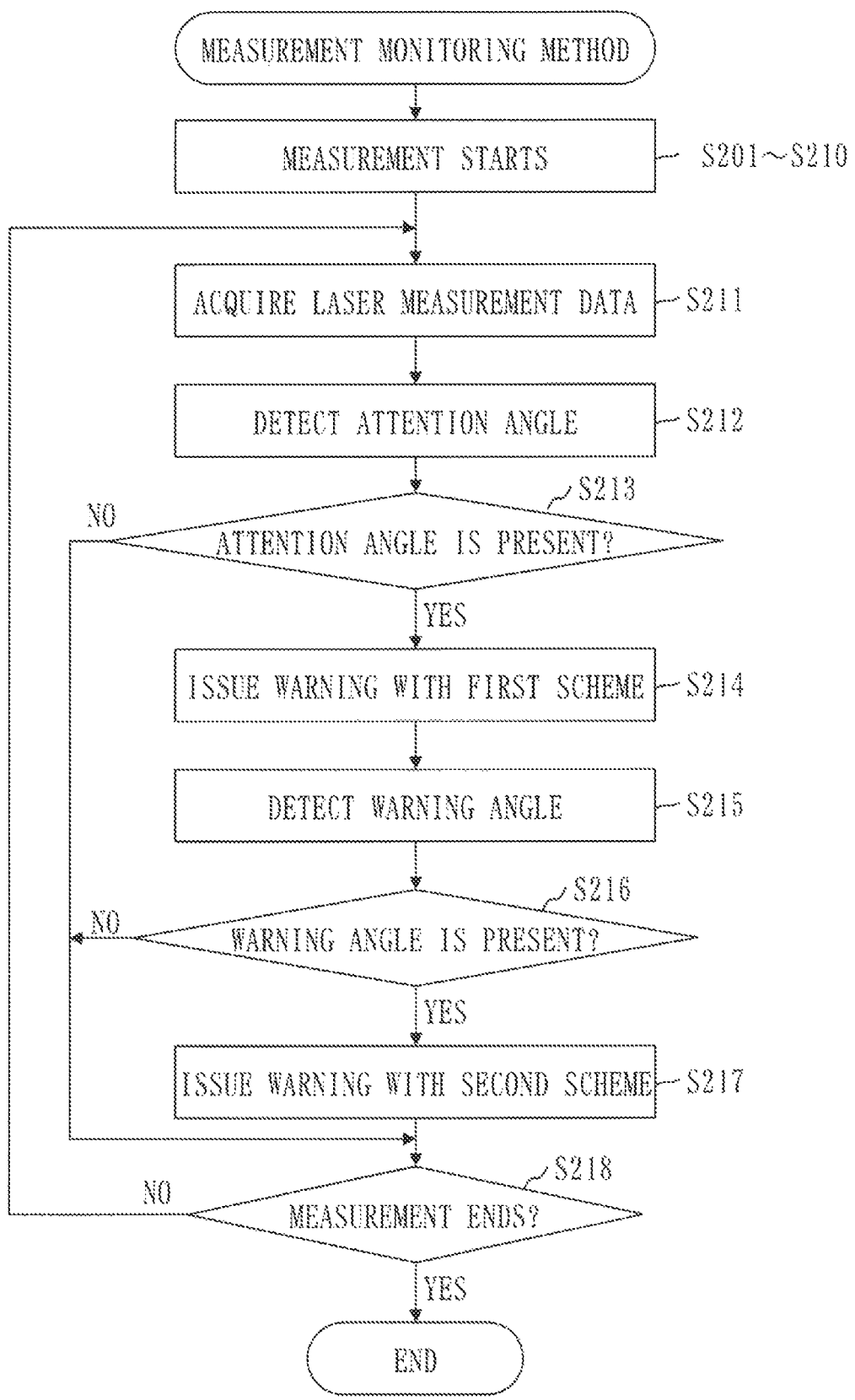
FIG. 19 is a flowchart of a measurement monitoring method in Embodiment 2.

Based on FIG. 19, description is made on an embodiment, mainly a point different from Embodiment 1, in which when an attention angle is detected, a warning is issued with a scheme different from that when a warning angle is detected.

Description of Structure

The structure of the measuring vehicle 100 is identical to the structure in Embodiment 1 (refer to FIG. 1 and FIG. 2).

The structure of the measurement monitoring device 200 is identical to the structure in Embodiment 1 (refer to FIG. 3).

Description of Operation

Based on FIG. 19, the measurement monitoring method is described.

Steps before a measurement is started (S201, S202, and S210) are identical to the steps in Embodiment 1 (S101, S102, and S110 of FIG. 4).

At step S211, the acquisition unit 294 acquires laser measurement data every time a laser measurement is performed.

Step S211 is identical to step S111 in Embodiment 1 (refer to FIG. 4).

At step S212, the first detection unit 211 detects an attention angle based on the acquired laser measurement data.

Step S212 is identical to step S112 in Embodiment 1 (refer to FIG. 4).

At step S213, the first detection unit 211 determines whether an attention angle is present.

Step S213 is identical to step S113 in Embodiment 1 (refer to FIG. 4).

When an attention angle is present, the process proceeds to step S214.

When an attention angle is absent, the process proceeds to step S218.

At step S214, the warning unit 213 issues a warning with a first scheme.

Specifically, the warning unit 213 selects an attention lane from the plurality of lanes on the measurement state screen 300 and highlights the attention lane on the measurement state screen 300.

The procedure at step S214 is identical to the procedure at step S116 in Embodiment 1 (refer to FIG. 13). However, it is different from step S116 in that the warning target lane is not the warning lane but the attention lane.

At step S215, the second detection unit 212 detects a warning angle.

Step S215 is identical to the procedure at step S114 in Embodiment 1 (refer to FIG. 4).

At step S216, the second detection unit 212 determines whether a warning angle is present.

Step S216 is identical to step S115 in Embodiment 1 (refer to FIG. 4).

At step S217, the warning unit 213 issues a warning with a second scheme.

Specifically, the warning unit 213 issues a warning sound from a loudspeaker.

At step S218, when the measurement ends, the process ends. When the measurement does not end, the process proceeds to step S218.

Step S218 is identical to step S117 in Embodiment 1 (refer to FIG. 4).

Effects of Embodiment 2

A warning may not be necessarily issued at the instant when blocking occurs. This is because small-sized blocking is often unavoidable. However, it is required to prevent an occurrence of large-sized blocking.

Thus, when blocking occurs, the measurement monitoring device 200 causes display of blocking on the screen, and issues a warning sound when blocking continues. This can call attention from the time of occurrence of blocking. As a result, an occurrence of large-sized blocking can be prevented. However, a warning may be issued with a scheme different from screen display and a warning sound.

Embodiment 3

Based on FIG. 20 to FIG. 23, description is made on an embodiment, mainly a point different from Embodiment 1, in which a warning is issued when an event other than blocking occurs.

Description of Structure

The structure of the measuring vehicle 100 is identical to the structure in Embodiment 1 (refer to FIG. 1 and FIG. 2).

Figure 20:
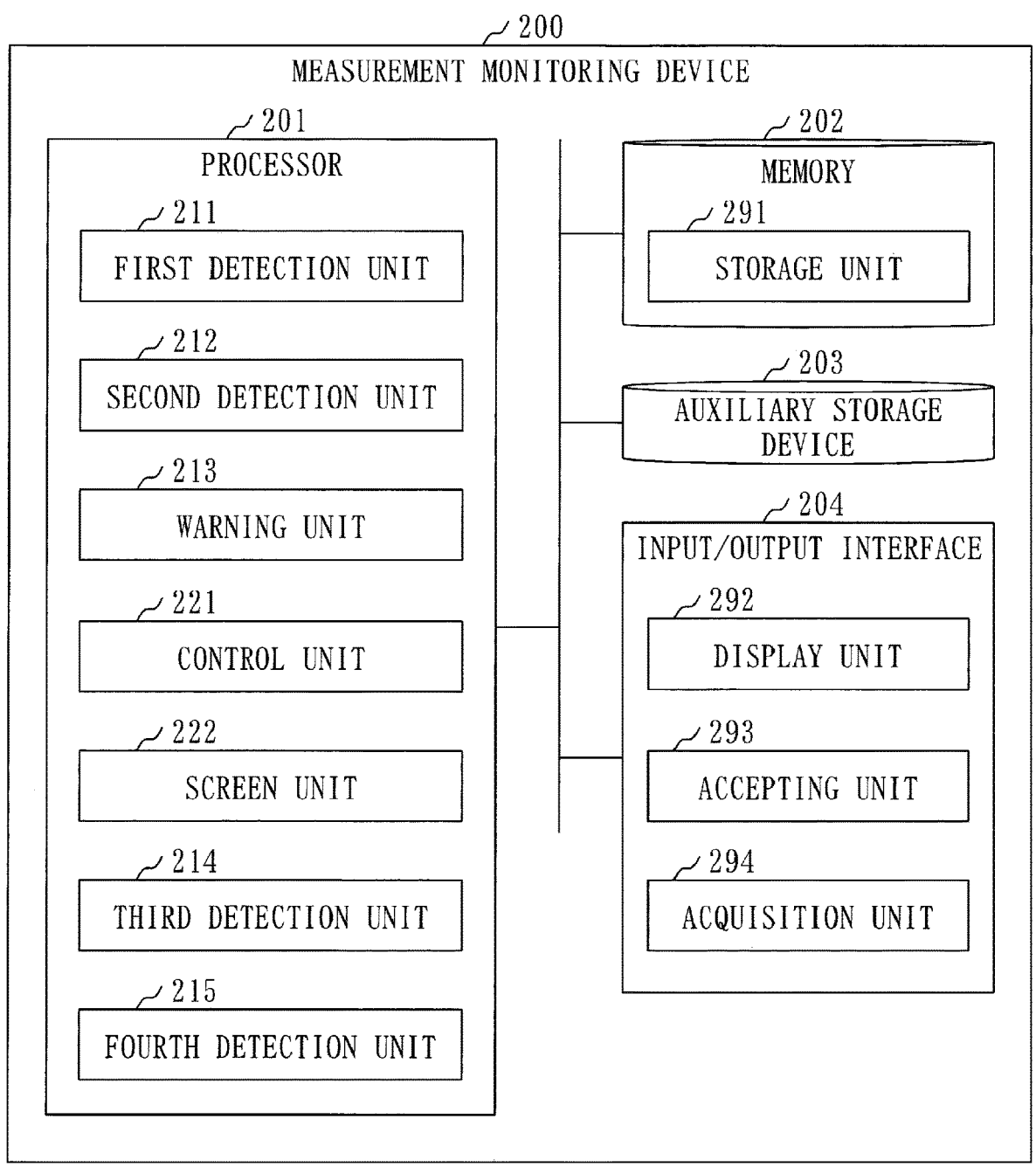
FIG. 20 is a configuration diagram of a measurement monitoring device 200 in Embodiment 3.

Based on FIG. 20, the structure of the measurement monitoring device 200 is described.

The measurement monitoring device 200 further includes a third detection unit 214 and a fourth detection unit 215.

The measurement monitoring program further makes the computer function as the third detection unit 214 and the fourth detection unit 215.

Description of Operation

Figure 21:
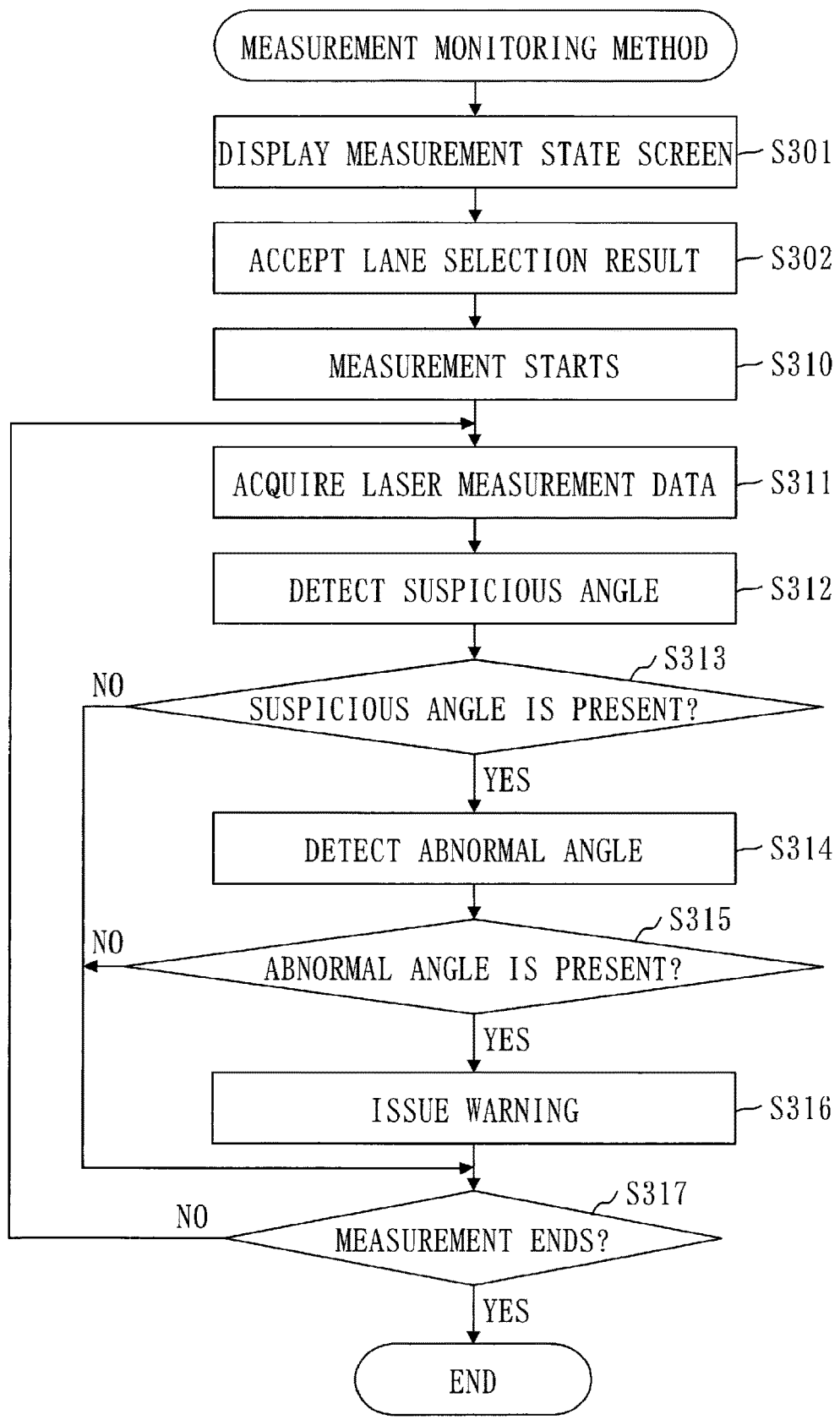
FIG. 21 is a flowchart of a measurement monitoring method in Embodiment 3.

Based on FIG. 21, a measurement monitoring method of monitoring an occurrence of a measurement anomaly is described.

Step S301 to step S310 are identical to step S101 to step S110 in Embodiment 1 (refer to FIG. 4).

At step S311, the acquisition unit 294 acquires laser measurement data every time a laser measurement is performed.

Step S311 is identical to step S111 in Embodiment 1 (refer to FIG. 4).

Step S312 to step S316 are performed together with step S112 to step S116 in Embodiment 1 (refer to FIG. 4). Depiction of step S112 to step S116 is omitted.

At step S312, the third detection unit 214 detects a suspicious angle based on the acquired laser measurement data.

The suspicious angle is an irradiation angle with a measurement distance not changed from the previous one.

Figure 22:
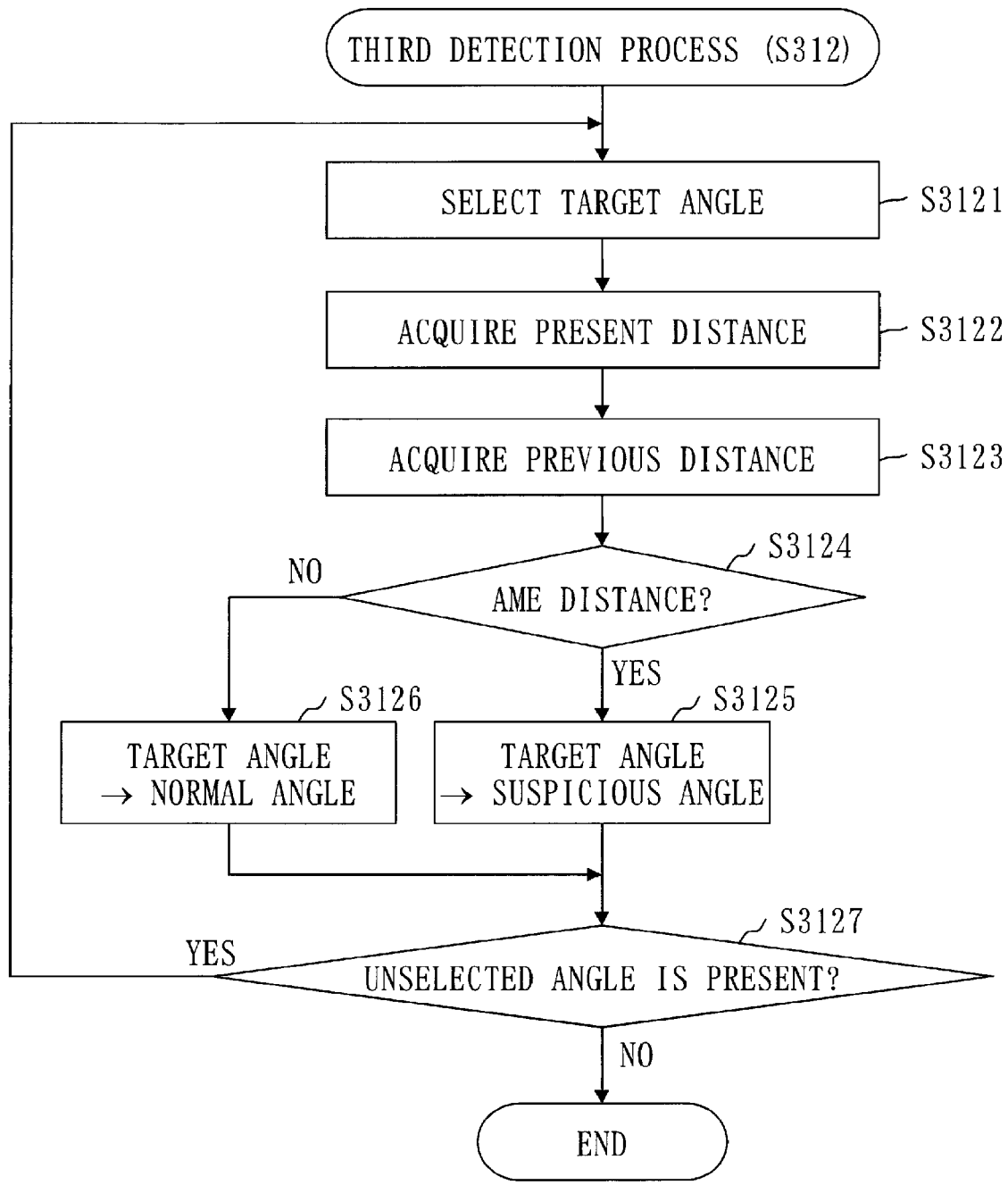
FIG. 22 is a flowchart of a third detection process (S312) in Embodiment 3.

Based on FIG. 22, the procedure of a third detection process (S312) is described.

At step S3121, the third detection unit 214 selects one unselected irradiation angle. The selected irradiation angle is referred to as a target angle in FIG. 22.

At step S3122, the third detection unit 214 acquires a measurement distance of the target angle from the present laser measurement data. The acquired measurement distance is referred to as a present distance in FIG. 22.

Also, the third detection unit 214 acquires a measurement time of the target angle from the present laser measurement data.

At step S3123, the third detection unit 214 acquires a measurement distance of the target angle from the previous laser measurement data. The acquired measurement distance is referred to as a previous distance in FIG. 22.

At step S3124, the third detection unit 214 compares the present distance with the previous distance.

When the present distance is equal to the previous distance, the process proceeds to step S3125.

When the present distance is different from the previous distance, the process proceeds to step S3126.

At step S3125, the third detection unit 214 classifies the target angle as the suspicious angle.

Specifically, the third detection unit 214 operates as follows.

The third detection unit 214 determines whether a suspicious angle with the same angle as the target angle has been registered in the storage unit 291.

If a suspicious angle with the same angle as the target angle has not been registered in the storage unit 291, the third detection unit 214 registers the suspicious angle with the same angle as the target angle in the storage unit 291. Furthermore, the third detection unit 214 registers a start time and a present time in the storage unit 291 in association with that suspicious angle. The registered start time and the registered present time are measurement times of the present distance.

If a suspicious angle with the same angle as the target angle has been registered in the storage unit 291, the third detection unit 214 updates the present time associated with that suspicious angle to a measurement time of the present distance.

At step S3126, the third detection unit 214 classifies the target angle as a normal angle.

Specifically, if the suspicious angle with the same angle as the target angle has been registered in the storage unit 291, the third detection unit 214 deletes that suspicious angle and information associated with that suspicious angle from the storage unit 291.

At step S3127, the third detection unit 214 determines whether an unselected irradiation angle is present. The unselected irradiation angle is referred to as an unselected angle in FIG. 22.

When an unselected angle is present, the process proceeds to step S3121.

When an unselected angle is absent, the process ends.

Referring back to FIG. 21, description continues from step S313.

At step S313, the third detection unit 214 determines whether a suspicious angle is present.

Specifically, the third detection unit 214 determines whether a suspicious angle has been registered in the storage unit 291.

When a suspicious angle is present, the process proceeds to step S314.

When a suspicious angle is absent, the process proceeds to step S317.

At step S314, the fourth detection unit 215 detects an abnormal angle.

The abnormal angle is an irradiation angle matching the suspicious angle for a time longer than a retention time.

The retention time is a predetermined time.

Figure 23:
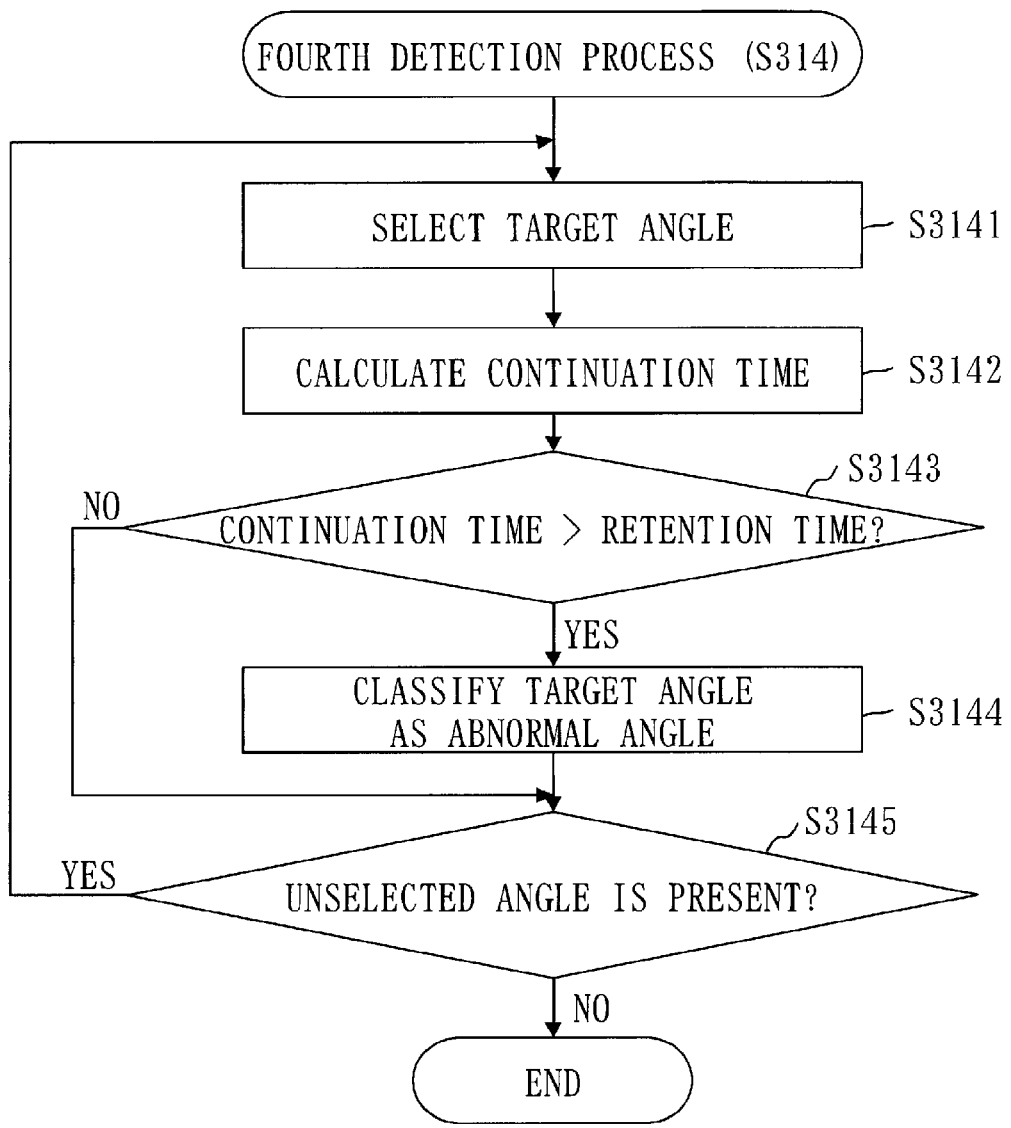
FIG. 23 is a flowchart of a fourth detection process (S314) in Embodiment 3.

Based on FIG. 23, the procedure at step S314 is described.

At step S3141, the fourth detection unit 215 selects one unselected suspicious angle. The selected suspicious angle is referred to as a target angle in FIG. 23.

At step S3142, the fourth detection unit 215 calculates a continuation time of the target angle.

Specifically, the fourth detection unit 215 acquires a start time of the target angle and a present time of the target angle from the storage unit 291. Then, the fourth detection unit 215 calculates a time from the start time to the present time. The calculated time is a continuation time of the target angle.

At step S3143, the fourth detection unit 215 compares the continuation time with the retention time.

When the continuation time is longer than the retention time, the process proceeds to step S3144.

When the continuation time is equal to or shorter than the retention time, the process proceeds to step S3145.

At step S3144, the fourth detection unit 215 classifies the target angle as the abnormal angle.

Specifically, the fourth detection unit 215 registers an anomaly flag in the storage unit 291 in association with the target angle.

At step S3145, the fourth detection unit 215 determines whether an unselected suspicious angle is present. The unselected suspicious angle is referred to as an unselected angle in FIG. 23.

When an unselected angle is present, the process returns to step S3141.

When an unselected angle is absent, the process ends.

Referring back to FIG. 21, description continues from step S315.

At step S315, the fourth detection unit 215 determines whether an abnormal angle is present.

Specifically, the fourth detection unit 215 determines whether a suspicious angle associated with the anomaly flag has been registered in the storage unit 291.

When an abnormal angle is present, the process proceeds to step S315.

When an abnormal angle is absent, the process proceeds to step S317.

At step S316, the warning unit 213 issues a warning.

For example, the warning unit 213 issues a warning with a scheme identical to that when the warning angle is detected in Embodiment 1. At step S317, when the measurement ends, the process ends. When the measurement does not end, the process proceeds to step S311.

Effects of Embodiment 3

A warning can be issued when an event other than blocking occurs. For example, a warning can be issued when a failure in the laser scanner 112, attachment of dust to the laser surface, or the like occurs.

Other Structures

Embodiment 2 may be applied to Embodiment 3. That is, a warning may be issued with different schemes when a suspicious angle is detected and when an abnormal angle is detected.

Supplemental Remarks of Embodiments

Figure 24:
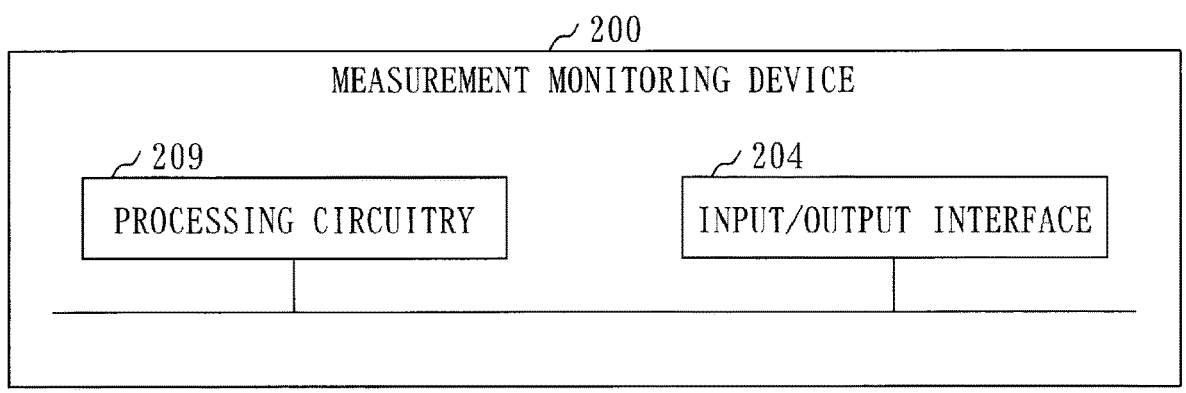
FIG. 24 is a hardware configuration diagram of a measurement monitoring device 200 in the embodiments.

Based on FIG. 24, the hardware configuration of the measurement monitoring device 200 is described.

The measurement monitoring device 200 includes a processing circuitry 209.

The processing circuitry 209 is hardware which implements the first detection unit 211, the second detection unit 212, the warning unit 213, the third detection unit 214, the fourth detection unit 215, the control unit 221, the screen unit 222, and the storage unit 291.

The processing circuitry 209 may be dedicated hardware or the processor 201 which executes a program stored in the memory 202.

When the processing circuitry 209 is dedicated hardware, the processing circuitry 209 is, for example, a single circuit, composite circuit, programmed processor, parallel-programmed processor, ASIC, FPGA, or a combination of these.

ASIC is an abbreviation of Application Specific Integrated Circuit, and FPGA is an abbreviation of Field Programmable Gate Array.

The measurement monitoring device 200 may include a plurality of processing circuits which replace the processing circuitry 209. The plurality of processing circuits share the role of the processing circuitry 209.

In the processing circuitry 209, part of the functions may be implemented by dedicated hardware and the remaining functions may be implemented by software or firmware.

In this manner, the processing circuitry 209 can be implemented by hardware, software, firmware, or a combination of these.

The embodiments are examples of preferable embodiment and are not intended to restrict the technical scope of the present invention. The embodiments may be partially implemented or may be implemented in combination of another embodiment. The procedures described by using the flowcharts and so forth may be changed as appropriate.

REFERENCE SIGNS LIST

100: measuring vehicle; 101: odometer; 110: sensor unit; 111: GPS antenna; 112: laser scanner; 113: camera;

114: IMU; 121: angle range; 122: angle range; 123: angle range; 124: angle range; 125: angle range; 126: angle range; 127: angle range; 128: angle range; 190: other vehicle; 200: measurement monitoring device; 201: processor; 202: memory; 203: auxiliary storage device; 204: input/output interface; 209: processing circuitry; 211: first detection unit; 212: second detection unit; 213: warning unit; 214: third detection unit; 215: fourth detection unit; 221: control unit; 222: screen unit; 291: storage unit; 292: display unit; 293: accepting unit; 294: acquisition unit; 300: measurement state screen; 310: lane selection interface; 311: switching button; 312: switching button; 313: switching button; 314: switching button; 315: switching button; 320: measurement state interface; 321: state mark; 322: state mark; 323: state mark; 324: state mark; 325: state mark

The invention claimed is:

1. A measurement monitoring device mounted on a measuring vehicle having a laser scanner mounted thereon, wherein the laser scanner repeatedly performs a laser measurement to acquire laser measurement data, and the laser measurement data indicates a measurement distance for each irradiation angle of laser light, the measurement monitoring device comprising:
an input/output interface to acquire the laser measurement data every time the laser measurement is performed and display a measurement state screen indicating a plurality of lanes; and
processing circuitry to
detect an attention angle, which is an irradiation angle corresponding to a measurement distance not included in a standard distance range, based on the acquired laser measurement data;
detect a warning angle, which is an irradiation angle matching the attention angle for a time longer than an allowable time; and
in response to detecting the warning angle, determine a warning lane, of the plurality of lanes, corresponding to the warning angle, issue a first warning, and highlight the determined warning lane on the measurement state screen when the determined warning lane is determined to be a valid lane.

2. The measurement monitoring device of claim 1, wherein the input/output interface accepts, from a user, a designation of the warning lane as valid or invalid, and the processing circuitry highlights the warning lane, only when the warning lane is designated as valid.

3. The measurement monitoring device according to claim 1, wherein
the measurement state screen has a lane selection interface for designating each of the plurality of lanes as valid or invalid,
the input/output interface accepts a lane selection result via the lane selection interface, and
the processing circuitry is further configured to determine, based on the lane selection result, whether the warning lane is the valid lane.

4. The measurement monitoring device according to claim 3, wherein the processing circuitry is further configured to not highlight the warning lane on the measurement state screen when the warning lane is determined to be an invalid lane.

5. The measurement monitoring device according to claim 1, wherein when the attention angle is detected, the processing circuitry is further configured to issue a second warning different from the first warning.

6. The measurement monitoring device according to claim 5, wherein
the processing circuitry is further configured to select an attention lane, which is a lane corresponding to the attention angle, from the plurality of lanes on the measurement state screen and highlight the attention lane on the measurement state screen.

7. The measurement monitoring device according to claim 6, wherein
the measurement state screen has a lane selection interface for designating each of the plurality of lanes as valid or invalid,
the input/output interface accepts a lane selection result via the lane selection interface, and
the processing circuitry is further configured to determine, based on the lane selection result, whether the attention lane is the valid lane and highlight the attention lane on the measurement state screen when the attention lane is determined to be the valid lane.

8. The measurement monitoring device according to claim 7, wherein the processing circuitry is further configured to not highlight the attention lane on the measurement state screen when the attention lane is determined to be an invalid lane.

9. The measurement monitoring device according to claim 5, wherein
when the warning angle is detected, the processing circuitry is further configured to issue a warning sound.

10. The measurement monitoring device according to claim 1, wherein the processing circuitry is further configured to
detect a suspicious angle, which is an irradiation angle with a measurement distance not changed from a previous one, based on the acquired laser measurement data,
detect an abnormal angle, which is an irradiation angle matching the suspicious angle for a time longer than a retention time, and
issue the first warning when the abnormal angle is detected.

11. A non-transitory computer-readable medium storing a measurement monitoring program of a computer mounted on a measuring vehicle having a laser scanner mounted thereon, wherein the laser scanner repeatedly performs a laser measurement to acquire laser measurement data, and the laser measurement data indicates a measurement distance for each irradiation angle of laser light, the measurement monitoring program causing the computer to:
acquire laser measurement data every time the laser measurement is performed;
display a measurement state screen indicating a plurality of lanes;
detect an attention angle, which is an irradiation angle corresponding to a measurement distance not included in a standard distance range, based on the acquired laser measurement data;
detect a warning angle, which is an irradiation angle matching the attention angle for a time longer than an allowable time; and
in response to detecting the warning angle, determine a warning lane, of the plurality of lanes, corresponding to the warning angle, issue a warning, and highlight the determined warning lane on the measurement state screen when the determined warning lane is determined to be a valid lane.

* * * * *